(12) United States Patent
Washisu

(10) Patent No.: US 7,180,043 B2
(45) Date of Patent: Feb. 20, 2007

(54) IMAGE TAKING APPARATUS

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 10/852,503

(22) Filed: May 24, 2004

(65) Prior Publication Data

US 2004/0238718 A1 Dec. 2, 2004

(30) Foreign Application Priority Data

May 29, 2003 (JP) ............................. 2003-153176

(51) Int. Cl.
*H04N 5/228* (2006.01)

(52) U.S. Cl. ................................ 250/208.1; 345/208.5
(58) Field of Classification Search ............. 250/208.1; 348/208.1–208.8, 208.11–208.15, 222, 335, 348/699–702; 396/54
See application file for complete search history.

(56) References Cited

U.S. PATENT DOCUMENTS

| 6,900,831 B2 * | 5/2005 | Nishiwaki ................. 348/208.5 |
| 2002/0097324 A1 * | 7/2002 | Onuki ......................... 348/208 |
| 2004/0095472 A1 * | 5/2004 | Yoshida et al. ......... 348/208.12 |
| 2004/0130638 A1 * | 7/2004 | Sakamoto .................... 348/254 |

FOREIGN PATENT DOCUMENTS

JP        03-110797        5/1991

* cited by examiner

*Primary Examiner*—Stephpone B. Allen
(74) *Attorney, Agent, or Firm*—Cowan, Liebowitz & Latman, P.C.

(57) ABSTRACT

An image taking apparatus which takes a first and a second images by using an image pickup device is disclosed. The image taking apparatus comprises a controller which detects a displacement amount of the second image with respect to the first image which is a reference image and performs predetermined processing at stages of pre-exposure for object observation and exposure for image taking and a display unit which displays the first and the second images.

10 Claims, 20 Drawing Sheets

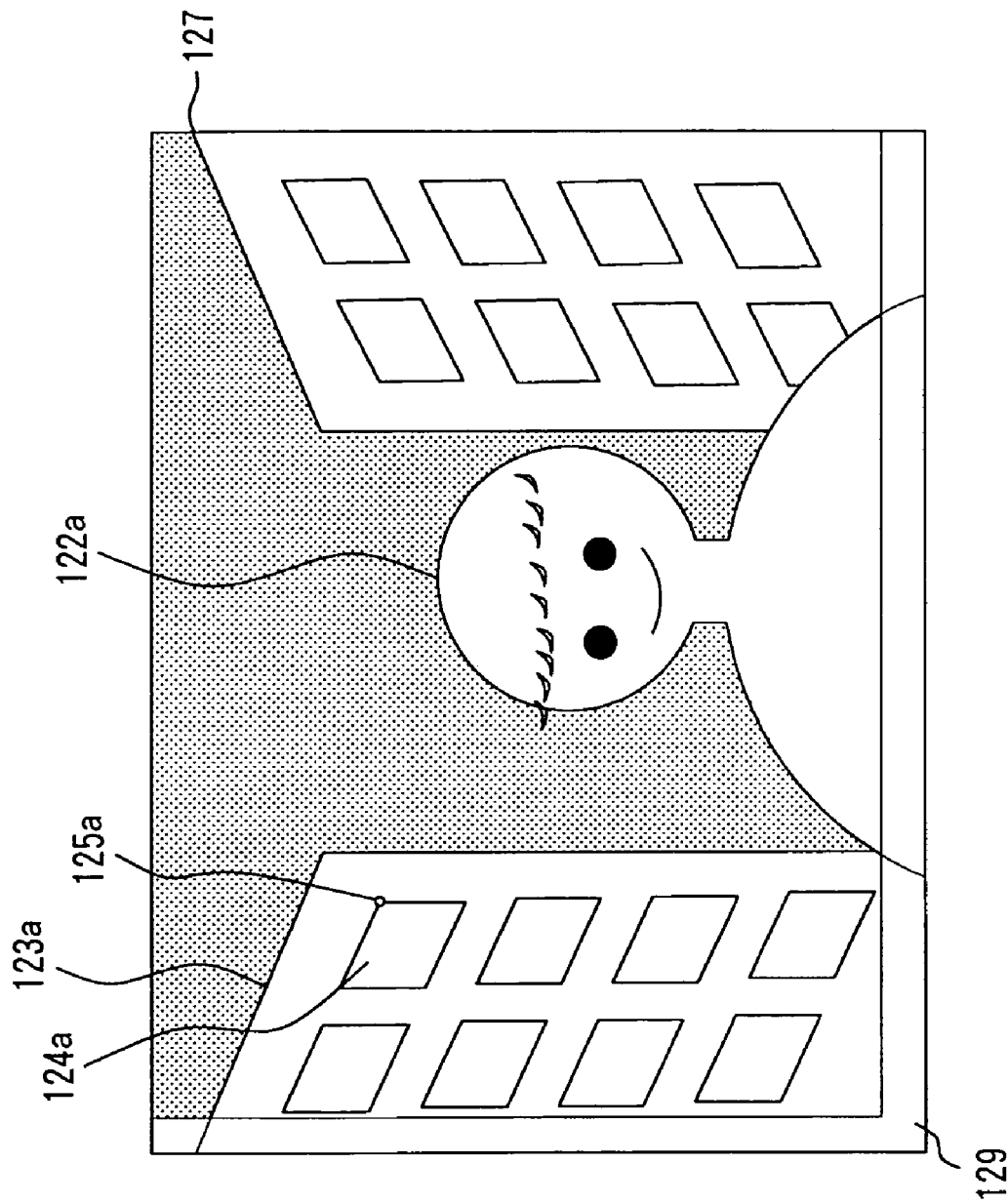

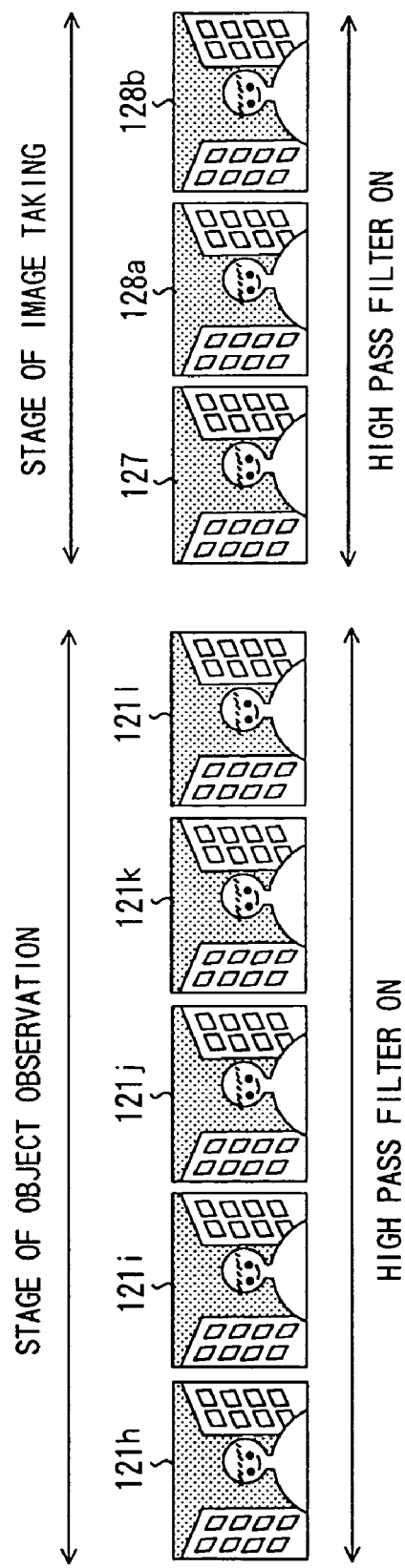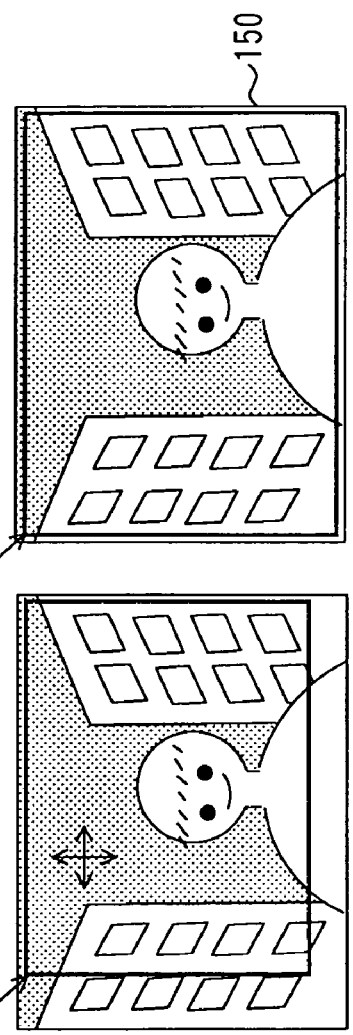

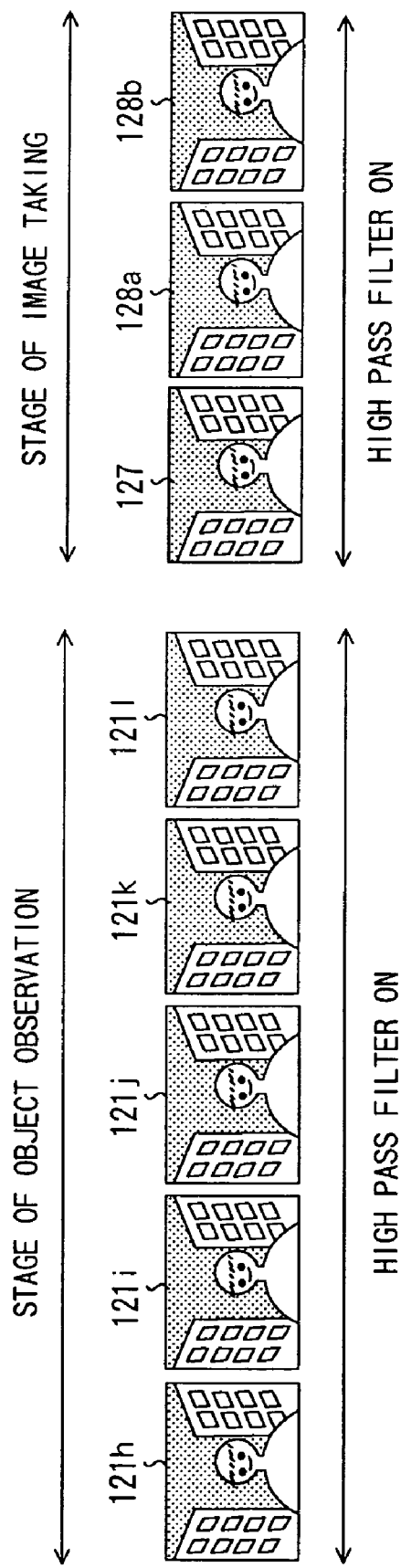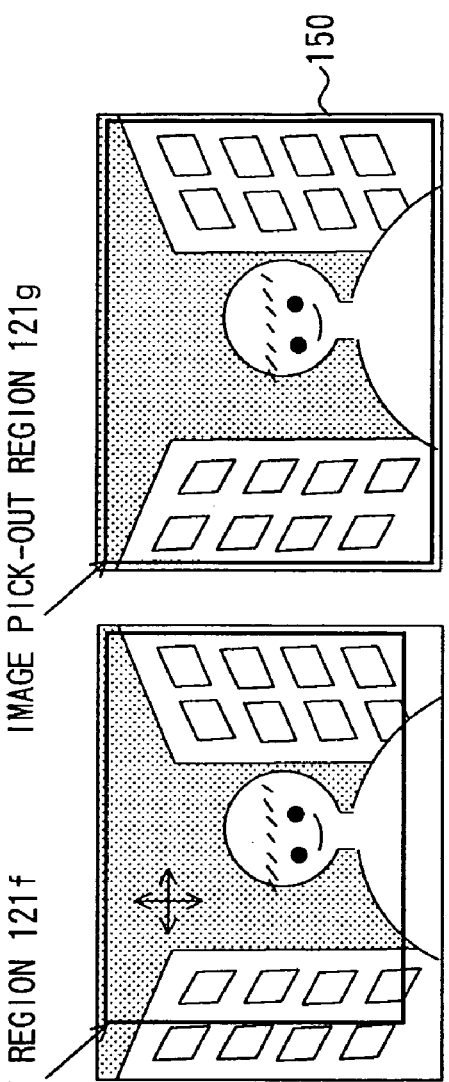

IMAGE TAKING APPARATUS

BACKGROUND OF THE INVENTION

1. Field of the Invention

The present invention relates to an image taking apparatus such as a digital camera, etc., which can obtain an image with an excellent image taking accuracy by correcting image blur caused by vibration.

2. Description of Related Art

In cameras existing presently, operations important for image taking, such as exposure determination and focusing, etc., are all automated, and even a person who is not skilled in camera operations has less possibility of failing in image taking.

Furthermore, recently, a system that suppresses image blur from being caused by vibration applied to the camera has also been studied, and factors that cause a photographer to fail in image taking have been reduced to almost zero.

Herein, a vibration isolation system that suppresses image blur is briefly described.

Vibration applied to a camera when image taking appears as vibration with a frequency of, normally, 1 Hz through 10 Hz, and as a basic consideration for enabling the camera to take an image without image blur even when such vibration occurs during image taking, it is required that camera shake due to hand vibration is detected and a correcting lens is displaced within an optical axis orthogonal plane according to the results of the detection (optical vibration isolation system).

Namely, in order to take an image without image blur even when camera shake occurs, it becomes necessary that, first, camera shake is accurately detected, and second, an optical axis change due to the shake is corrected.

Vibration applied to a camera can be detected by, in principle, mounting on a camera a vibration detecting unit that detects acceleration, angular acceleration, angular velocity, and angular displacement, etc., and carries out proper calculation for the results of the detection. Then, by driving a vibration correcting optical unit (including a correcting lens) that corrects image taking optical axis displacement on the basis of the detection information on camera shake outputted from the vibration detecting unit, image blur correction operation is carried out.

On the other hand, a method can be used in which an image pickup operation is repeated a plurality of times with an exposure period with a length that does not cause image blur, and a plurality of images obtained through these image pickup operations are synthesized while correcting image displacement among the images to obtain a taken image (synthesized image). This method is disclosed in Japanese Patent Publication No. 3110797 (hereinafter, referred to as Document 1).

Recent digital cameras have become smaller in size than silver haloid compact cameras, and in particular, a camera that has an image pickup device of a VGA class has been downsized so that it is build-in in a portable electronics device (such as a portable phone).

In these circumstances, in order to mount the abovementioned optical vibration isolation system on a camera, it is necessary that the vibration correcting optical unit is made smaller or the vibration detecting unit is made smaller.

However, in the vibration correcting optical unit, since a correcting lens must be supported and highly accurately driven, there is a limit to downsizing. In addition, most of the vibration detecting units that are currently used utilize inertia, so that if the vibration detecting units are downsized, detection sensitivity lowers and accurate vibration correction becomes impossible.

Furthermore, vibration to be applied to cameras includes angular vibration around a predetermined axis and shifting vibration that shakes a camera parallel, and although the angular vibration is correctable by the optical vibration isolation system, the shifting vibration is hardly corrected. The shifting vibration tends to become greater as the camera becomes smaller.

On the other hand, a different vibration isolation system, as has been employed in a video camera for taking a moving image, and a method in which a motion vector readout from an image pickup device is detected and an image readout position is changed according to the detected motion vector to obtain a moving image without image blur can also be employed.

This method has an advantage in that the camera can be downsized since the vibration detecting unit and the vibration correcting optical unit (including a correcting lens) in the abovementioned optical vibration isolation system become unnecessary.

However, the vibration isolation system used in video cameras cannot be easily applied to digital still cameras. The reason for this is described below.

Motion vector extraction is carried out for each image reading, and for example, when images of 15 frames are extracted per second, motion vectors are detected by comparing these extracted images.

However, in a case where a still image is taken by a digital camera, exposure is carried out only once for the image pickup device, so that detection of motion vectors through comparison of images as in a video camera is not possible.

Therefore, the vibration isolation system for video cameras cannot be simply applied to digital still cameras.

On the other hand, in the vibration isolation method disclosed in Document 1, since an image pickup operation is repeated a plurality of times, an image taking period becomes long.

This long image taking period does not pose a problem when an image of a still object is taken. However, when an image of an object such as a person that slightly moves is taken, shake of the object side (object vibration) is caused, and image deterioration caused by object vibration cannot be suppressed although image blur caused by camera shake can be suppressed.

Furthermore, as in the case of a video camera, if composition displacement is always corrected based on a motion vector, a taken image is left locked on an object at an initial point of image taking even after the camera is intentionally moved for panning, and this makes it impossible to obtain an image which a photographer intends to take by framing operation (determining an image taking composition).

Therefore, usability of the video camera is improved by intentionally attenuating low-frequency components of motion vector signals (displacement signals). This results in lowering in vibration isolation-accuracy, so that even by synthesizing a plurality of obtained images, it is not possible to obtain an image whose blur has been highly accurately corrected.

SUMMARY OF THE INVENTION

According to one aspect of the image taking apparatus of the present invention, an image taking apparatus which takes a first and a second images by using an image pickup device, comprises a controller which detects a displacement amount of the second image with respect to the first image which is a reference image and performs predetermined processing at stages of pre-exposure for object observation and exposure for image taking and a display unit which displays the first and the second images. Herein, at the stage of pre-exposure for object observation, the controller determines regions to be displayed on the display unit in the first and the second images based on the displacement amount, and makes the display unit to display the images in the regions sequentially in predetermined periods, and at the stage of exposure for image taking, the controller synthesizes the first and the second images so that the second image conforms to the first image based on the displacement amount to generate a synthesized image whose exposure is corrected.

According to another aspect of the image taking apparatus of the invention, an image taking apparatus which obtains a synthesized image whose exposure is corrected by synthesizing a first and a second images taken sequentially by using an image pickup device, comprises a detection section which detects a displacement amount of the second image with respect to the first image which is a reference image, a coordinate conversion section which performs coordinate conversion to the second image so as to conform to the first image based on the detection result of the detection section, a synthesis section which synthesizes the second image having been converted by the coordinate conversion section and the first image to generate the synthesized image, a display unit which displays the synthesized image, and a recording section which records the synthesized image. Herein, at least one of an operation of the display unit which displays a plurality of the synthesized images sequentially in a predetermined periods and an operation of the recording section which records a plurality of the synthesized images sequentially in a predetermined periods is performed.

BRIEF DESCRIPTION OF THE DRAWINGS

FIG. 4 is a drawing for explaining image synthesis in Embodiment 1 of the present invention.

FIGS. 5A to 5C are drawings showing images obtained at the stages of object observation and image taking in Embodiment 1 of the present invention.

FIGS. 16A to 16C are explanatory views of conditions of taken images in Embodiment 3 of the present invention.

DETAILED DESCRIPTION OF THE PREFERRED EMBODIMENT

Embodiment 1

Figure 1:
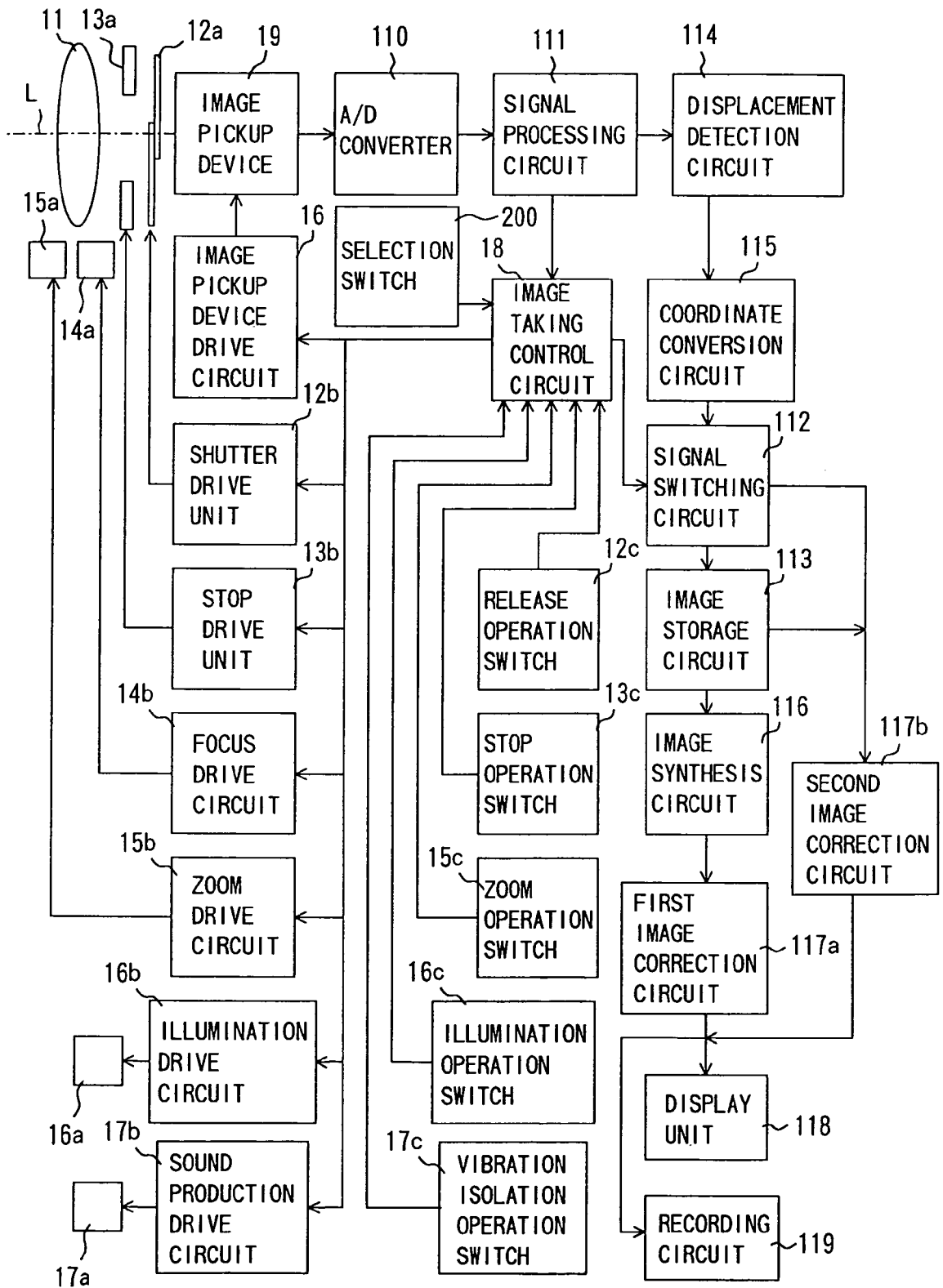
FIG. 1 is a block diagram showing a structure of a camera of Embodiment 1 of the present invention.

FIG. 1 is a diagram showing the structure of a camera (image taking apparatus) of Embodiment 1 of the present invention. A light flux (image taking light flux) that has entered from an image taking lens 11 is restricted in light amount by a stop 13a and passes through a shutter 12a, and then reaches a light receiving surface of an image pickup device 19. The image pickup device 19 is composed of a semiconductor image pickup device such as an MOS or a CCD. In FIG. 1, only one image taking lens is shown, however, in actuality, a plurality of image taking lenses (including a focusing lens and a zooming lens) are provided.

The image taking lens 11 (focusing lens) carries out focusing by moving on an optical axis L by receiving a driving force from an AF drive motor 14a and stopping at a predetermined focal position. The AF drive motor 14a drives by receiving a drive signal from a focus drive circuit 14b.

Furthermore, the image taking lens 11 (zooming lens) changes the focal length of the image taking optical system by moving on the optical axis L by receiving a driving force from a zoom drive motor 15a and stopping at a predetermined zoom position. The zoom drive motor 15a drives by receiving a drive signal from a zoom drive circuit 15b.

The stop 13a has a plurality of stop blades, and these stop blades move by receiving a driving force from a stop drive unit 13b and change an aperture area (stop aperture diameter) serving as a light passage. The shutter 12a has a plurality of shutter blades, and these shutter blades open and close the aperture that serves as a light passage by receiving a driving force from a shutter drive unit 12b. Thereby, the light amount of the light flux to enter the image pickup device 19 is controlled.

Driving of the zoom drive circuit 15b, the focus drive circuit 14b, the stop drive unit 13b, the shutter drive unit 12b, an illumination drive circuit 16b, and a sound production drive circuit 17b is controlled by the image taking control circuit 18.

The image taking control circuit 18 controls operations of the image pickup device 19 (a charging operation and a charge readout operation) via an image pickup device drive circuit 16.

Operation signals of a release operation switch 12c, a stop operation switch 13c, a zoom operation switch 15c, an illumination operation switch 16c, and a vibration isolation operation switch 17c are inputted into the image taking control circuit 18. The image taking control circuit 18 controls driving of the focus drive circuit 14b, the zoom drive circuit 15b, the stop drive unit 13b, the shutter drive unit 12b, and the illumination drive circuit 16b in response to inputted operation signals.

The image taking control circuit 18 detects an object luminance (photometry) on the basis of image signals taken into a signal processing circuit 111 that is described later, and determines the stop aperture diameter of the stop 13a, the open period of the shutter 12a, and use of the illumination unit 16a on the basis of the results of the photometry. Furthermore, the image taking control circuit 18 calculates a focal position on the basis of an output from the signal processing circuit 111 while driving the focus drive circuit 14b, that is, while moving the image taking lens 11 (focusing by a so-called contrast detection method).

Image signals outputted from the image pickup device 19 are converted into digital signals by an A/D converter 110 and inputted into the signal processing circuit 111. The signal processing circuit 111 generates color image signals by applying signal processing such as luminance signal and color signal formation to the inputted signals.

Then, image signals subjected to signal processing by the signal processing circuit 111 are displayed as a taken image by being outputted to a display unit 118, and outputted to and recorded in a recording circuit 119.

Hereinafter, a case where a photographer depresses halfway a release button (not shown) provided on the camera and takes an image while observing an object through the camera is described. It is assumed that the photographer selects a vibration isolation mode as a set mode of the camera by operating the vibration isolation operation switch 17c.

First, when the photographer depresses halfway the release button, a first switch (SW1) of the release operation switch 12c is turned on, and an image taking preparation operation (including focusing operation and photometry, etc.) is started. The image taking control circuit 18 determines the open period (exposure period) of the shutter 12a and the stop aperture diameter of the stop 13a on the basis of photometric values obtained through photometry. Furthermore, the image taking control circuit 18 calculates a focal position of the focusing lens by driving the focus drive circuit 14b on the basis of an output of the signal processing circuit 111. Furthermore, the image taking control circuit 18 makes emission setting (flash lighting and so-called flat type lighting (luminous intensity is larger and luminous period is longer than that of flash lighting)) of the illumination unit 16a on the basis of the obtained photometric values, etc.

A displacement detection circuit 114 extracts a characteristic point from image obtained through image pickup operation as described later, and calculates position coordinate of the characteristic point within an image taking plane.

Figure 2:
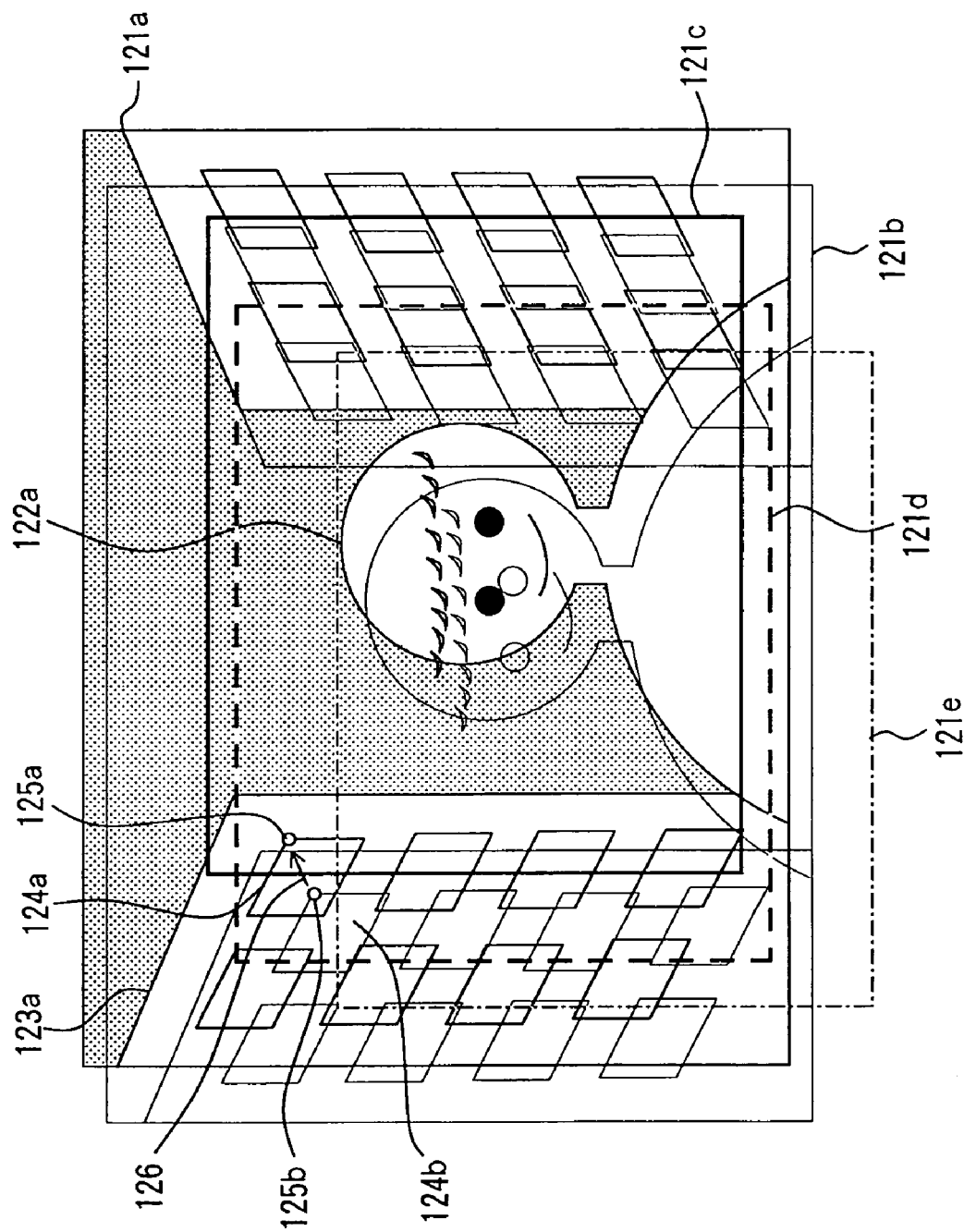
FIG. 2 is a drawing for explaining coordinate conversion in Embodiment 1 of the present invention.

Herein, as shown in FIG. 2, a case where an image of an object which is a person standing against a building is taken is described.

Herein, when a plurality of images are acquired, like the image 121b, an image having a composition displaced from the image 121a due to camera shake may be obtained. The displacement detection circuit 114 extracts, as a characteristic point, an edge 125a of a window 124a which is a point with a high luminance in the building 123a positioned outside the central region of the image 121a. In the same manner, an edge 125b of a window 124b is also extracted from the image 121b as a characteristic point. Then, the difference between the characteristic point 125a and the characteristic point 125b is calculated by comparing them, and the image 121b is corrected (coordinate-converted) according to the difference.

For example, the characteristic point 125a and the characteristic point 125b are made correspondent to each other by using methods of template matching, etc., and a characteristic point 125b that corresponds to the characteristic point 125a is searched for in the image 121b, whereby a motion vector is calculated based on a period required for switching of the image 121a and the image 121b and a displacement between the characteristic point 125a and the characteristic point 125b. In FIG. 2, the image 121b is subjected to coordinate conversion so that the characteristic point 125b of the image 121b is moved in the direction of the arrow 126 so as to conform the characteristic point 125a.

Herein, the reason why the region outside the central region of the image taking plane is selected as a characteristic point extraction region is described. In many cases of image taking, a main object is positioned near the image plane center and is a person. In such a case, if a characteristic point is extracted form the region of the main object, object vibration poses a problem.

Namely, not only camera shake of a photographer but also object vibration influence during acquirement of the plurality of images, so that the image coordinate conversion is applied based on the object vibration.

Herein, it appears that an image including a main object whose composition has been made proper (image without image blur) is created since image coordinate conversion is applied based on object vibration, however, generally, movement of a person is complicated, the image displacement detection accuracy is greatly influenced by the position where a characteristic point is selected, and vibration of the entire main object may not be properly corrected.

For example, in a case where a part corresponding to an eye of a main object (person) is selected as a characteristic point, blinking influences, and in a case where the tip of a hand is selected as a characteristic point, a hand easily moves and this movement is different from the actual vibration of the entirety of the person. When one point of a person is thus selected as a characteristic point and image coordinate conversion is carried out on the basis of the characteristic point, the entirety of the person is not always properly coordinate-converted. Furthermore, even by applying coordinate conversion to a plurality of images and synthesizing them, a preferable image (image without image blur) is not always obtained since the position of the coordinates of the characteristic point scatters among the images.

Therefore, a preferable image is more likely to be obtained when a characteristic point is extracted form a region corresponding to a still object such as a background and image coordinate conversion is carried out on the basis of the characteristic point as in this embodiment.

The coordinate conversion circuit 115 applies coordinate conversion to a specific image so that a characteristic point in the specific image detected by the displacement detection circuit 114 overlaps a characteristic point in an image obtained immediately before the specific image.

Herein, the coordinate conversion circuit 115 changes the position of image pick-out region in the each acquired image based on image data outputted from the displacement detection circuit 114, and carries out coordinate conversion so that the characteristic points of the images overlap each other. Namely, in FIG. 2, an image in the region 121c enclosed by a solid line is picked out from the image 121a, and an image in the region 121d enclosed by a dotted line is picked out from the image 121b.

Herein, on the basis of the coordinate relationship with respect to the characteristic point 125a of FIG. 2, an image pick-out region in the image 121a is set, whereby in subsequent images, regions from which images are picked out are determined based on the characteristic point (for example, the characteristic point 125b). Namely, by setting a relationship (positional relationship) between a characteristic point and an image pick-out region in one image, regions from which images are picked out in other images are determined on the basis of the characteristic points in the other images and the relationship.

The positions of the image pick-out regions determined as mentioned above serve as reference positions (display reference positions) for image display, and when images are displayed, a stable image without image blur can be displayed by matching only the image pick-out regions.

Furthermore, the side of the image pick-out regions are definitely set for all images in an object observation state (observation of an object displayed on the display unit 118). Furthermore, as shown in FIG. 2, considerable space (space having a predetermined amount) is secured between the outline of the image pick-out region (121c or 121d) and the outline of the picked-up image (121a or 121b).

Herein, images in the image pick-out regions in the respective picked-up images are identical to each other, however, if the image pick-out regions are excessively large, when composition displacement between the images due to camera shake becomes greater, the image pick-out regions may move out of the picked-up images like the image pick-out region 121e shown by an alternate long and short dashed line in FIG. 2. Therefore, in this embodiment, in all picked-up images, the image pick-out regions are set to be smaller than a predetermined size so that the image pick-out regions are within the respective picked-up images.

The respective image data that have been subjected to coordinate conversion by the coordinate conversion circuit 115 are transmitted to a signal switching circuit 112.

The signal switching circuit 112 transmits the image data subjected to coordinate conversion to a second image correcting circuit 117 when an object is observed by using the display unit 118, and transmits the image data subjected to coordinate conversion to an image storage circuit 113 during an image taking operation.

Image data inputted into a second image correcting circuit 117 are subjected to gamma correction and compression, and then outputted to the display unit 118. Then, in the display unit 118, the image data are displayed (electronically displayed) in response to image pickup periods (image rate) by matching the image pick-out regions in the respective images. Herein, when an object is dark, the gain of the image signals is raised by the second image correcting circuit 117.

On the display unit 118, a moving image is displayed by displaying image data in periods of 1/30 seconds, and to display a moving image, an image pickup operation must be carried out in an exposure period shorter than the display period.

In a case where an image pickup operation is carried out in a short exposure period, a picked-up image becomes underexposed when an object is dark. Therefore, it is required that the image whose exposure is corrected by raising the gain of the image signals is displayed. Herein, the gain increase results in a noise component increase, however, since it is displayed as a moving image and the display unit 118 provided on the back surface, etc., of the camera is small, noise is not so conspicuous. The gain may be raised at the stage of the image pickup operation which is performed by using the image pickup device 19.

When a photographer observes an object image by using the display unit 118, the positions of the image pick-out regions (display reference positions) are changed as mentioned above and images whose coordinates have been converted are successively displayed on the display unit 118, so that a stable moving image without image blur can be observed.

Furthermore, in the object observation state, the displacement detection circuit 114 calculates motion vectors by correlation calculation of characteristic points in images acquired through image pickup operations, and detects image displacements based on the motion vectors. Herein, image coordinate conversion closely following the calculated motion vectors may pose a problem.

For example, when a photographer carries out framing operation such as panning, etc., of the camera, if characteristic point changes caused by framing operation are also picked up as motion vectors, the display on the display unit 118 does not change even after panning, and the displayed image is locked on the object.

In order to avoid the abovementioned problem, in actual displacement detection, coordinate conversion is carried out on the basis of signals obtained by eliminating low-frequency components from motion vector signals which changes during image taking operations.

Camera shake appears as periodic vibration of approximately 1 through 10 Hz, however, panning appears as movement with a frequency (for example, 0.05 Hz) lower than the frequency of camera shake. In this embodiment, motion vector signals obtained by the displacement detection circuit 114 are filtered by a low-band elimination filter (hereinafter, referred to as a high pass filter) and the high pass filter is set to have characteristics in which frequencies being equal to or lower than a first frequency (for example, 0.3 Hz) is eliminated, whereby vibration caused by camera shake and vibration caused by panning are distinguished from each other.

In this embodiment, the vibration isolation effect is further lowered by lowering the time constant of the high pass filter (for example, changing the time constant so that vibration signals of frequencies being equal to or lower than 1 Hz are eliminated) as the camera motion becomes greater, whereby images responding to the camera motion are displayed on the display unit 118. In a case where motion vectors clearly prove image taking with panning, the correction of the composition displacements is not carried out with respect to the directions of the motion vectors.

Next, description is given for a case where the release button is fully depressed and a second switch (SW2) of the release operation switch 12c is turned on, thereby an image taking operation is carried out.

As mentioned above, focusing and photometry are carried out when the SW1 is turned on at the stage of object observation. Herein, based on the results of photometry, the close timing (exposure period) of the shutter 12a and the stop aperture diameter of the stop 13a for image taking are set, however, generally, an object is dark under image taking conditions where a vibration isolation system is used, so that the stop is set to full-open and the exposure period is set to a long exposure period.

In this embodiment, when the exposure period is set to be long, the exposure period is divided into a plurality of short exposure periods, and an image pickup operation (image acquiring) is repeated the number of times corresponding to the number of division. Namely, an image pickup operation with a short exposure period is continuously repeated a plurality of times. Due to such division into short exposure periods, images obtained through the image pickup operations become underexposed, however, they are less influenced by vibration (have less image blur). Then, after all the image pickup operations are finished, the plurality of images obtained through the image pickup operations are synthesized into one image (taken image), whereby exposure is improved.

Herein, in some cases where the plurality of images are acquired, the composition (object image) slightly displaces among the images due to camera shake during the plurality of serial image pickup operations although image blur does not occur in each image. If the images obtained through the plurality of times of image pickup operations are synthesized as they are, the images are synthesized while including composition displacements and a synthesized image with image blur is generated.

In this embodiment, a plurality of image signals outputted from the image pickup device 19 in response to the plurality of serial image pickup operations are, as mentioned above, converted into digital signals by the A/D converter 110 and then subjected to signal processing by the signal processing circuit 111. Output signals of the signal processing circuit 111 are inputted into the displacement detection circuit 114 as well as the image taking control circuit 18.

The displacement detection circuit 114 extracts characteristic points from the acquired images and calculates position coordinates of the characteristic points in the acquired image planes.

In FIG. 2, the image 121b is subjected to coordinate conversion so that the characteristic point 125b of the image 121b conform the characteristic point 125a of the image 121a. Namely, the characteristic points in the respective images are used as references for image coordinate conversion.

However, in a case where a plurality of images are subjected to coordinate conversion and synthesized, object vibration will influence the synthesized image due to movement of the camera and movement of the object while the plurality of images are successively obtained. Therefore, in this embodiment, when one image is obtained among a plurality of images, illumination light of the illumination unit 16a is irradiated to the object.

Herein, one image acquired by using illumination light of the illumination unit 16a is defined as a first image, and the remaining each image acquired without illumination light of the illumination unit 16a is defined as second image.

At this point, between the first image and the second image, the following difference exists in addition to the composition displacements mentioned above. That is, the brightness of an illuminated region which the illumination light has reached in the first image is different from the brightness of region in the second image corresponding to the illuminated region. Sufficient exposure is obtained in the illuminated region (for example, a region in which a main object is positioned) of the first image, and exposure is insufficient in the region other than the illuminated region, that is, region which the illumination light has not reached (for example, regions in which a background is positioned). The reason for this is that the main object such as a person is generally positioned close to the camera and the illumination light reaches the main object, however, the background is far from the camera and the illumination light does not reach the background.

In this embodiment, with respect to the underexposed regions, exposure is complemented by synthesizing the second images whose composition displacements have been corrected (coordinate-converted) with the first image.

Figure 3A:
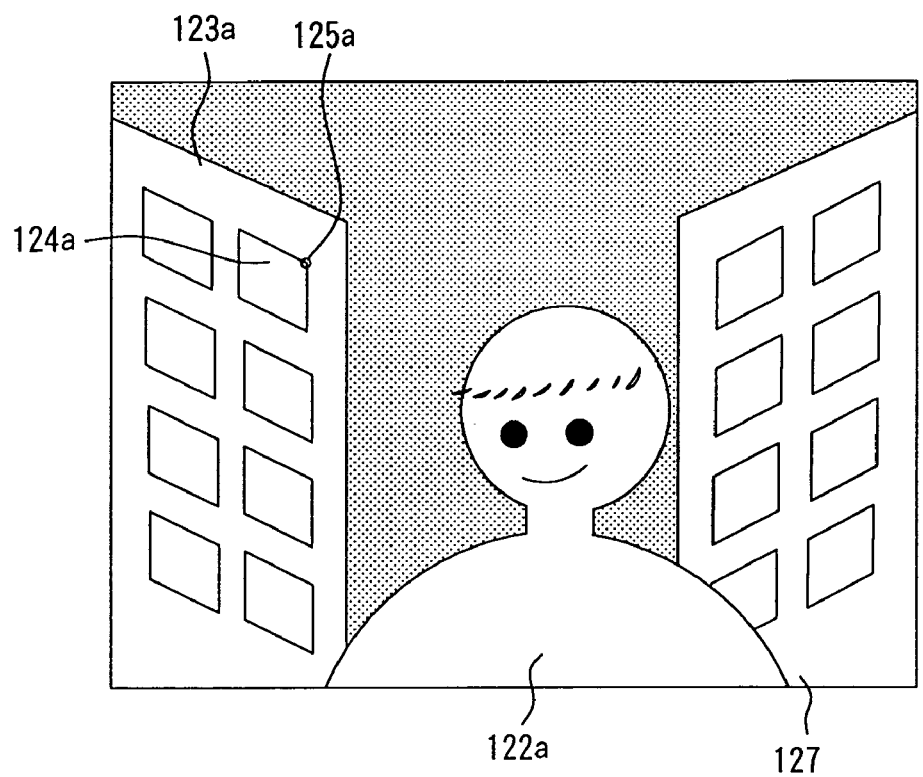
FIGS. 3A and 3B are drawings for explaining a characteristic point extraction region in Embodiment 1 of the present invention.

A selection method for a characteristic point extraction region is described with reference to FIG. 3A and FIG. 3B.

When the first image 127 (FIG. 3A) obtained by using illumination light of the illumination unit 16a and the second image 128 (FIG. 3B) obtained without using the illumination light of the illumination unit 16a are compared with each other, the person 122a in the first image 127 is bright due to reach of the illumination light, and on the other hand, the person 122b in the second image 128 (identical to the person 122a as an object) is dark without reach of the illumination light.

On the other hand, with respect to a region without reach of the illumination light, the difference of the brightness between the first image 127 and the second image 128 is little. Namely, the brightness of the building 123a in the first image 127 and the brightness of the building 123b in the second image 128 are almost equal to each other.

As mentioned above, a region without brightness difference is underexposed since illumination light does not reach, so that the region is considered as a point of image synthesis and defined as a characteristic point extraction region. Then, a characteristic point is extracted from the region without brightness difference, and based on the characteristic point, composition displacements are corrected.

In this embodiment, an edge 125a having a high luminance of a window 124a is extracted as a characteristic point from the region (building 123a) having no brightness difference in the first image 127, found by comparison with the second image 128. With respect to the second image 128, the edge 125b having a high luminance of the window 124b is extracted as a characteristic point from a region (building 123b) having no brightness difference in the same manner. Then, the characteristic point 125a in the first image 127 and the characteristic point 125b in the second image 128 are compared with each other.

The coordinate conversion circuit 115 applies coordinate conversion to the second image 128 so that the characteristic point 125b of the second image 128 conforms the characteristic point 125a of the first image 127.

Figure 3B:
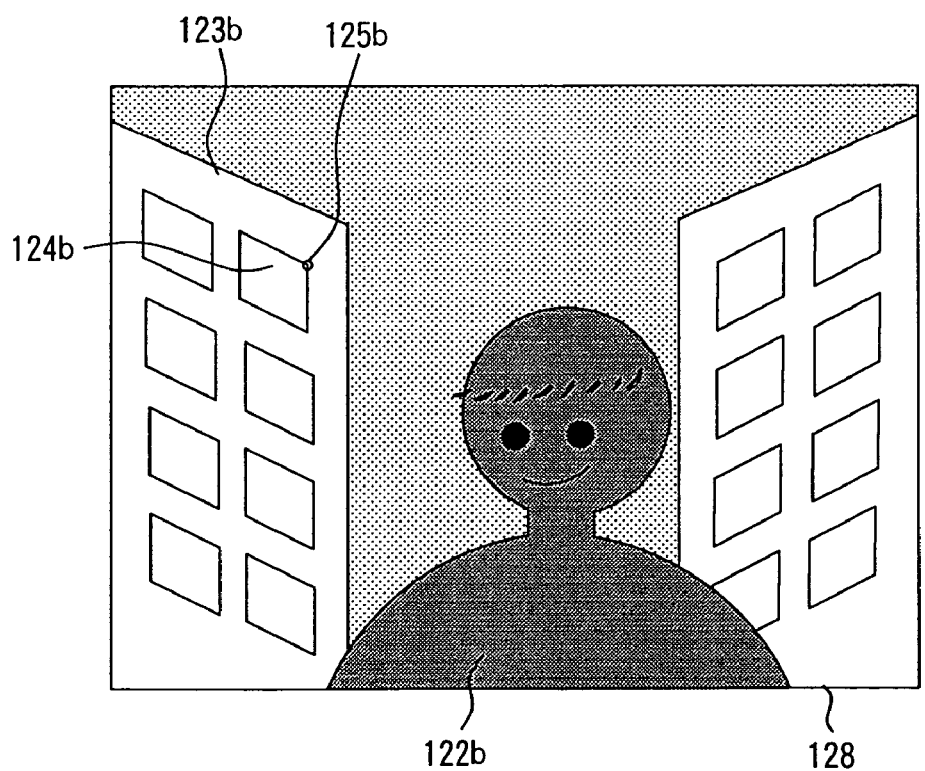

Herein, in FIG. 3B, one of the plurality of second images is shown, however, characteristic points are also extracted from other second images in the same manner, and coordinate conversion is applied to the other second images so that the characteristic points conform the characteristic point 125a of the first image 127. Namely, the characteristic point 125a of the first image 127 is used as a reference for coordinate conversion, and coordinate conversion is applied to the respective second images so that the characteristic points of the respective second images conform the characteristic point 125a.

Herein, coordinates of the characteristic points of the respective images are calculated for the sake of explanation, however, in actuality, correlation calculation of the first image 127 and the second image 128 is carried out and changes of pixel positions corresponding to each other are determined as a motion vector and defined as a characteristic point change.

For other second images, motion vectors are calculated by calculating the correlation with the first image 127 and defined as characteristic point changes.

Instead of extraction of only one characteristic point from each image, it is also possible that a plurality of characteristic points are extracted from each image, and an average motion vector or a minimum scalar of these characteristic points is defined as a characteristic point change.

Herein, use of the minimum value as a characteristic point change is for selecting the most moveless characteristic point since the characteristic points extracted from the images have a possibility of moving by themselves.

At the stage of object observation, while the motion vector changes during acquirement of images, coordinate conversion is applied on the basis of signals from which low-frequency components have been eliminated. This is for responding to framing operation of the camera at the stage of object observation, however, this case results in lowering in motion vector detection accuracy.

As mentioned above, if the characteristics of the high pass filter are set so as to eliminate frequencies equal to or lower than the first frequency (for example, 0.3 Hz) and motion vector signals are filtered by the high pass filter, it becomes impossible to correct vibration of the eliminated low-frequency components.

Actual camera shake appears as periodic vibration of 1 through 10 Hz, so that it is considered that the elimination of vibration signals equal to or lower than 0.3 Hz does not pose a problem, however, the high pass filter that eliminates frequencies equal to or lower than 0.3 Hz may have a harmful influence such as phase displacement on even the signals of 1 Hz.

Therefore, for accurate vibration correction, it is preferable that the high pass filter is not provided. However, at the stage of image taking, except for special image taking such as image taking with panning, framing operation of the camera is rare, so that coordinate conversion can be carried out based on highly accurate motion vector signals without using the high pass filter.

Furthermore, in special image taking such as image taking with panning, the motion vector amount increases in a specific direction, so that motion vector detection in the specific direction is stopped and response to framing operation of the camera is possible.

During framing operation of the camera, the camera has a motion in a predetermined direction from the stage of object observation, and the motion is found by comparing images successively renewed at the stage of object observation. In detail, when the motion vectors among the images are great in a predetermined direction and this condition continues, it is judged that the motion has been caused in the predetermined direction.

As mentioned above, when it is clear that framing operation of the camera is carried out, at the stage of object observation, the position of the image pick-out region (image display region) in a framing operation direction is changed, and the vibration isolation effect is lowered or the vibration isolation operation in the framing direction is stopped.

At the stage of image taking, by thus setting the vibration detection performance similar to that at the stage of object observation, image taking according to a photographer's intention can be carried out.

Furthermore, as mentioned above, at the stage of object observation, the coordinate conversion circuit 115 determines image pick-out regions in the respective images and carries out image picking out every time the images are acquired. On the other hand, at the stage of image taking, the coordinate conversion circuit 115 calculates motion vectors, and based on the motion vectors, applies coordinate conversion to the second images so that the second images conform the first image, however, it does not carry out image picking out from the images (first and second images).

Image data subjected to coordinate conversion by the coordinate conversion circuit 115 are outputted to the image storage circuit 113 via the signal switching circuit 112. In the image storage circuit 113, only the image data (first image data) acquired by using illumination light of the illumination unit 16a is stored. The image data stored in the image storage circuit 113 is outputted to the image synthesis circuit 116.

In the image synthesis circuit 116, the acquired image data are successively synthesized to generate one image data (synthesized image data). Then, when the image pickup operation is carried out for the number of times set in advance, the image pickup operation is finished and image data synthesis is ended.

As described above, in this embodiment, by using the first image obtained by using illumination light of the illumination unit 16a as a reference (center), coordinate conversion is applied to the second images so that the respective second images conform the first image.

Herein, the reason why the first image 127 is used as a reference is described.

As shown in FIG. 2, when two images (first and second image) with compositions displaced from each other are synthesized, a region 129 in which the two images do not overlap with each other is generated as shown in FIG. 4.

Therefore, the image synthesis circuit 116 cuts the region 129 and applies expansion and complement processing to only the regions in which the two images overlap with each other so as to restore the image to the original image size. Therefore, according to the orientation and degree of the composition displacement, a part of the synthesized image is cut.

Herein, among the first image and the plurality of second images, image information (exposure and composition of the main object) which is most excellent is obtained in the first image obtained by using the illumination light of the illumination unit 16a. Therefore, in order to use the region of the first image as much as possible, it is preferable that the first image is defined as a reference for coordinate conversion and the second images are made to conform the first image.

In the case of digital images, with respect to one underexposed image, exposure correction is possible by raising the gain of the image signals, however, if the gain is raised, the noise also increases and results in an undesirable image. However, as in this embodiment, in the case where the gain of the entire image is raised by synthesizing a plurality of images, an image with a high S/N ratio can be obtained by averaging noise of the respective images, and as a result, noise is suppressed and exposure is made proper. In another consideration, it can also be said that, for example, a plurality of images are taken by allowing noise and setting a high sensitivity of the image pickup device 19, and image signals are subjected to averaging process, whereby random noise included in the image is reduced.

The image synthesis circuit 116 sets a region in which all the acquired images overlap with each other as an image pick-out region, and cuts the region 129 including no overlap.

In this embodiment, at the stage of object observation, the image pick-out region is determined in advance, however, at the stage of image taking, the image pick-out region is determined after image synthesis.

Therefore, as the composition displacement caused by camera shake becomes smaller, the region 129 to be cut also becomes smaller and an image with a wide angle of view can be obtained.

Image data synthesized by the image synthesis circuit 116 is inputted into a first image correcting circuit 117a and subjected to gamma correction and compression, and then outputted to the display unit 118, displayed as a taken image, and recorded in the recording circuit 119. Herein, the first image data obtained by using the illumination light of the illumination unit 16*a* is also recorded in the recording circuit 119.

By thus recording the synthesized image whose exposure is proper in all region and the first image whose exposure is almost proper in only the region irradiated with the illumination light, a photographer can select one of the synthesized image and the first image by operating a select switch 200 (see FIG. 1) which is provided on the camera.

FIG. 5 show conditions of images obtained through image pickup operations when the vibration isolation system is turned on by operating the vibration isolation operation switch 17*c*.

Images acquired at the stage of object observation are shown by the images 121*h*, 121*i*, 121*j*, 121*k*, and 121*l*. The image pick-out regions 121f in the respective images 121*h* through 121*l* are determined based on signals filtered by the high pass filter in the motion vector signals obtained through correlation calculation of the images (calculation of correlation with a specific image). Then, only images in the image pick-out regions 121f are displayed on the display unit 118.

The operations at the stage of object observation are the same as the operations at the stage of image taking, wherein every time an image pickup operation is carried out, the abovementioned processing is applied to image data generated by the image pickup operation and the image displayed on the display unit 118 is renewed. Thereby, the image displayed on the display unit 118 has no image blur, and display (moving image display) responding to framing operation of the camera is possible.

At the stage of image taking, the image 127 (first image) is acquired by using the illumination light of the illumination unit 16a, and the images 128*a* and 128*b* (second images) are successively acquired without using the illumination light of the illumination unit 16*a*. Image synthesis is carried out after coordinate conversion is carried out based on signals that have not been filtered by the high pass filter in motion vector signals obtained through correlation calculation of these images, and the region 129 (FIG. 4) in which the images do not overlap in the synthesized image is cut. Then, an image pick-out region 121*g* (see FIG. 5C) in the synthesized image is set, the synthesized image data is recorded in the recording circuit 119, and the image 127 is also recorded in the recording circuit 119.

Herein, conditions of images to be displayed on the display unit 118 at the stage of observation object and after the stage of image taking are described with reference to FIG. 6.

Figure 6:
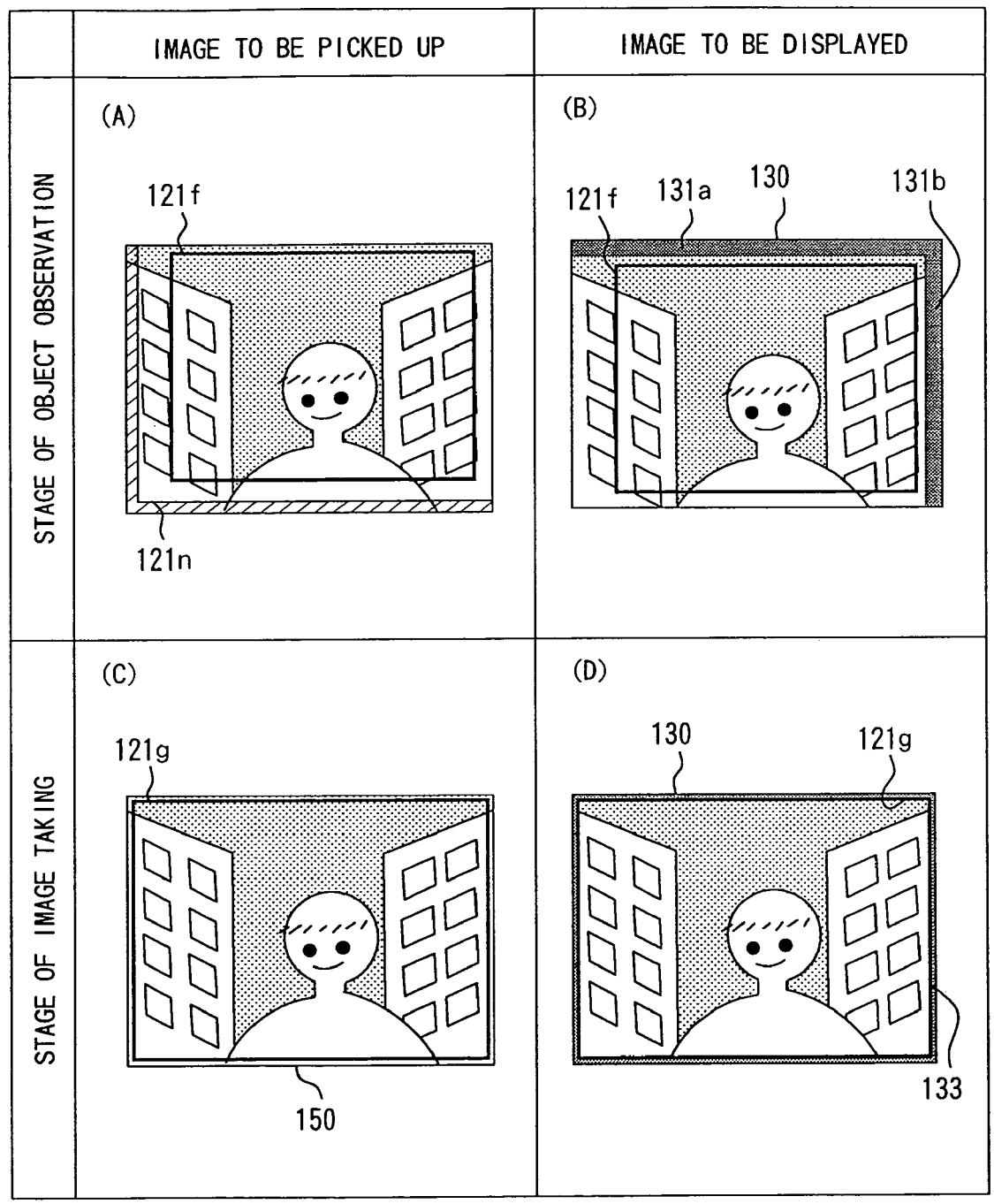
FIG. 6 is drawing showing picked-up images and images to be displayed in Embodiment 1 of the present invention.

In FIG. 6, (A) shows an image to be generated by an image pickup operation at the stage of object observation, and (B) shows an image to be displayed on the display unit 118 at the stage of object observation. (C) shows a synthesized image generated at the stage of image taking, and (D) shows an image to be displayed on the display unit 118 after the stage of image taking.

At the stage of object observation, the specific region 121f in the image shown in (A) is set as an image pick-out region. Then, when the image is displayed on the display unit 118, as shown in (B), the image display is set so that the image pick-out region 121f is positioned at the center of the display screen 130.

Therefore, the region 121*n* (shaded region) protruding from the display screen 130 in the image shown in (A) is not displayed on the display unit 118. Furthermore, the regions 131*a* and 131*b* (see FIG. 6(B)) in which image deficiencies occur in the display screen 130 are displayed by being masked in, for example, gray.

A photographer can know the degree of camera shake by looking at the masked regions in the display screen. Furthermore, the image is stable in the image pick-out region 121f, and as shown in (B), images are displayed in regions other than the image pick-out region 121f, so that a photographer can determine a composition when taking an image while observing the surrounding situation.

At the stage of image taking, as shown in (C), an image pick-out region 121*g* is determined in the synthesized image 150 generated through coordinate conversion and image synthesis. Herein, composition displacements among images at the stage of image taking become smaller than those at the stage of object observation, so that the image pick-out region 121*g* can be set wider than the image pick-out region 121f at the stage of object observation.

Then, when the synthesized image (taken image) generated at the stage of image taking is displayed on the display unit 118, as shown in (D), the image display is set so that the image pick-out region 121*g* is positioned at the center of the display screen 130.

In this embodiment, since only the image data corresponding to the image pick-out region 121*g* is recorded in the recording circuit 119, region other than the image pick-out region 121*g* in the synthesized image 150 is not displayed on the display screen 130. Then, the region 133 (see FIG. 6(D)) in which image deficiencies occur in the display screen 130 is displayed by being masked in, for example, gray. In the structure mentioned above, since the magnification of the displayed image at the stage of object observation and the magnification of the displayed image after the stage of image taking are matched with each other, image display without a sense of discomfort is possible.

Figure 7:
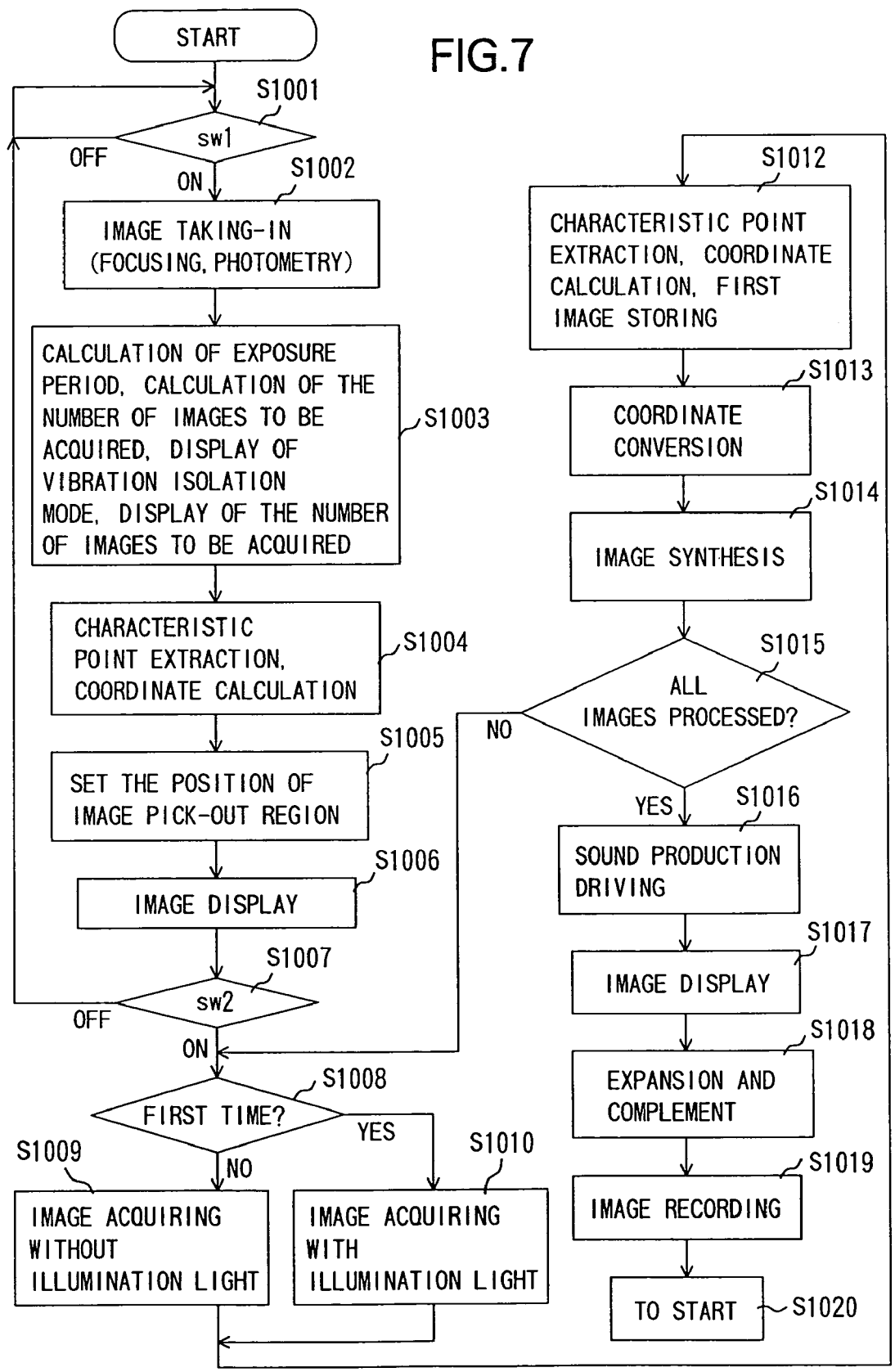
FIG. 7 is a flowchart showing image taking operations of the camera of Embodiment 1 of the present invention.

FIG. 7 is a flowchart showing image taking operation in the camera of this embodiment, and this flow starts when the power source of the camera is turned on.

At Step S1001, the process waits until the SW1 is turned on by half-depression of the release button by a photographer, and when the SW1 is turned on, the process advances to Step S1002.

At Step S1002, an image pickup operation using the image pickup device 19 is started. The image taking control circuit 18 moves the image taking lens (focusing lens) 11 in the optical axis direction by driving the AF drive motor 14*a* while detecting the contrast of the object image (image to be taken) based on output signals from the signal processing circuit 111. Then, when the contrast becomes highest, the image taking optical system is turned into a focused state by stopping driving of the image taking lens 11 (focusing by a so-called hill-climbing method). It is also possible that focusing is carried out by a phase difference detection method.

The image taking control circuit 18 calculates the brightness (luminance) of the object image based on an output of the image pickup device 19 (photometry).

At Step S1003, the image taking control circuit 18 determines the number of images to be acquired based on the brightness of the object calculated at Step S1002.

For example, the brightness of the object is measured (photometry), and it is supposed that for proper exposure based on the photometry results, the stop 13*a* must be set to full-open (for example, f2.8) and the open period (exposure period) of the shutter 12*a* must be set to ⅛ seconds.

Herein, when the focal length of the image taking optical system is 30 mm as regards 35 mm film, image taking with an exposure period set to ⅛ seconds has a possibility of image blur due to camera shake. Therefore, the exposure period is shortened so as to repress image blur, and the image pickup operation (image acquiring) is repeated a plurality of times according to the shortened exposure period. In detail, the exposure period is set to 1/32 seconds and the image pickup operation is carried out four times. On the other hand, when the focal length of the image taking optical system is 300 mm, the exposure period is set to 1/320 seconds and the image pickup operation is carried out forty times so as to repress image blur.

In this embodiment, when the plurality of times of serial image pickup operations are carried out, the exposure period in each image pickup operation is determined according to image taking conditions, and the number of times of image pickup operations is also determined according to image taking conditions. When a plurality of times of image pickup operations are carried out for the same object, more accurate image information can be obtained by making the exposure condition in each image pickup operation as close to a proper exposure condition as possible.

Therefore, in a case where the object is dark, the lens is dark since the stop is stopped down, or the sensitivity of the image pickup device is set to be low, the exposure period in each image pickup operation is set as long as possible to obtain an effective exposure condition.

However, if the exposure period is set excessively long, image deterioration is caused by camera shake. Therefore, as mentioned above, when the focal length of the image taking optical system is 30 mm as regards 35 mm film, the exposure period is set to 1/32 seconds that is approximately one over a focal length to suppress image blur. Then, the image pickup operation with this exposure period is carried out a plurality of times, and a plurality of obtained images are synthesized, whereby exposure is corrected.

When the focal length is longer than 30 mm, the exposure period of 1/32 seconds has a possibility of resulting in image blur due to camera shake, so that the exposure period is set shorter. Then, the number of times of image pickup operations is increased according to the shortened exposure period, and a plurality of obtained images are synthesized, whereby exposure is corrected.

In the plurality of times of image pickup operations, the exposure period in each image pickup operation becomes longer as the object becomes darker, the image taking lens becomes darker, or the sensitivity of the image pickup device becomes lower, and the exposure period becomes shorter as the focal length of the image pickup optical system becomes longer.

Furthermore, the number of times of image taking operations to be carried out with an exposure period shorter than a proper exposure period becomes larger as the object becomes darker, the image taking lens becomes darker, the sensitivity of the image pickup device becomes lower, or the focal length of the image taking optical system becomes longer.

As described above, after calculation of the number of times of image pickup operations, on a display unit provided within the optical finder of the camera or a liquid crystal display unit (display unit 118) provided on the outer package of the camera, information indicating that a vibration isolation mode (mode in which the abovementioned image pickup operation is carried out a plurality of times) has been set is displayed and information on the number of times of image pickup operations is displayed. A photographer can know the setting of the vibration isolation mode and the number of times of image pickup operations by looking at the display.

At Step S1004, the displacement detection circuit 114 extracts a characteristic image (characteristic point) from an image obtained through the image pickup operation of the image pickup device 19, and calculates the coordinates of the characteristic point. Herein, the characteristic point can be extracted from a region (for example, the region in which the building 123a is positioned in FIG. 2) in which a still object is highly possibly positioned in the image as mentioned above.

Herein, low-frequency components are eliminated from the motion vector signal at the stage of object observation by the high pass filter as mentioned above, so that framing operation of the camera becomes easy.

At Step S1005, based on the coordinates of the characteristic point calculated at Step S1004, the coordinate conversion circuit 115 determines the position of an image pick-out region.

As described later, when the magnitude of the motion vector in a predetermined direction is equal to or higher than a predetermined value, the position of the image pick-out region is changed with respect to the predetermined direction.

This is for responding to framing operation of the camera. In detail, when the motion (speed) of the camera is greater than a predetermined value, frequency components lower than normal are eliminated from the detected motion vector signal by using a high pass filter. Then, based on the motion vector from which low-frequency components have been eliminated, the position of the image pick-out region is set. Furthermore, when the motion vector clearly proves image taking with panning, the image pick-out region is set regardless of the motion vectors.

Details of the operation at Step S1005 are described with reference to the flowchart of FIG. 8.

Figure 8:
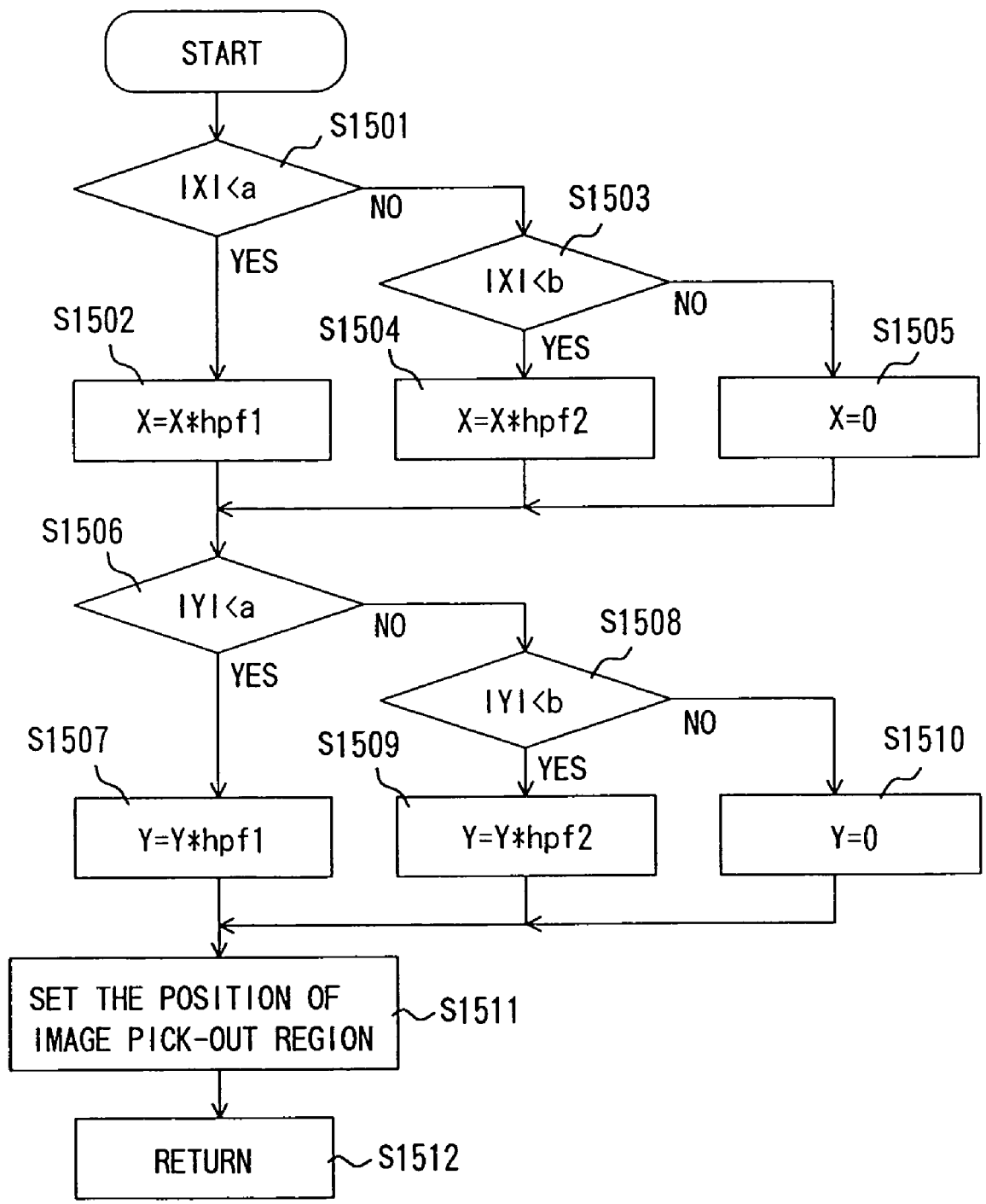
FIG. 8 is a subroutine showing actions of a high pass filter in Embodiment 1 of the present invention.

FIG. 8 is a subroutine of Step S1005 of FIG. 7. This flow starts when the process advances to Step S1005. First, the magnitude of the motion vector with respect to the image in the X (image horizontal) direction is judged.

Figure 9:
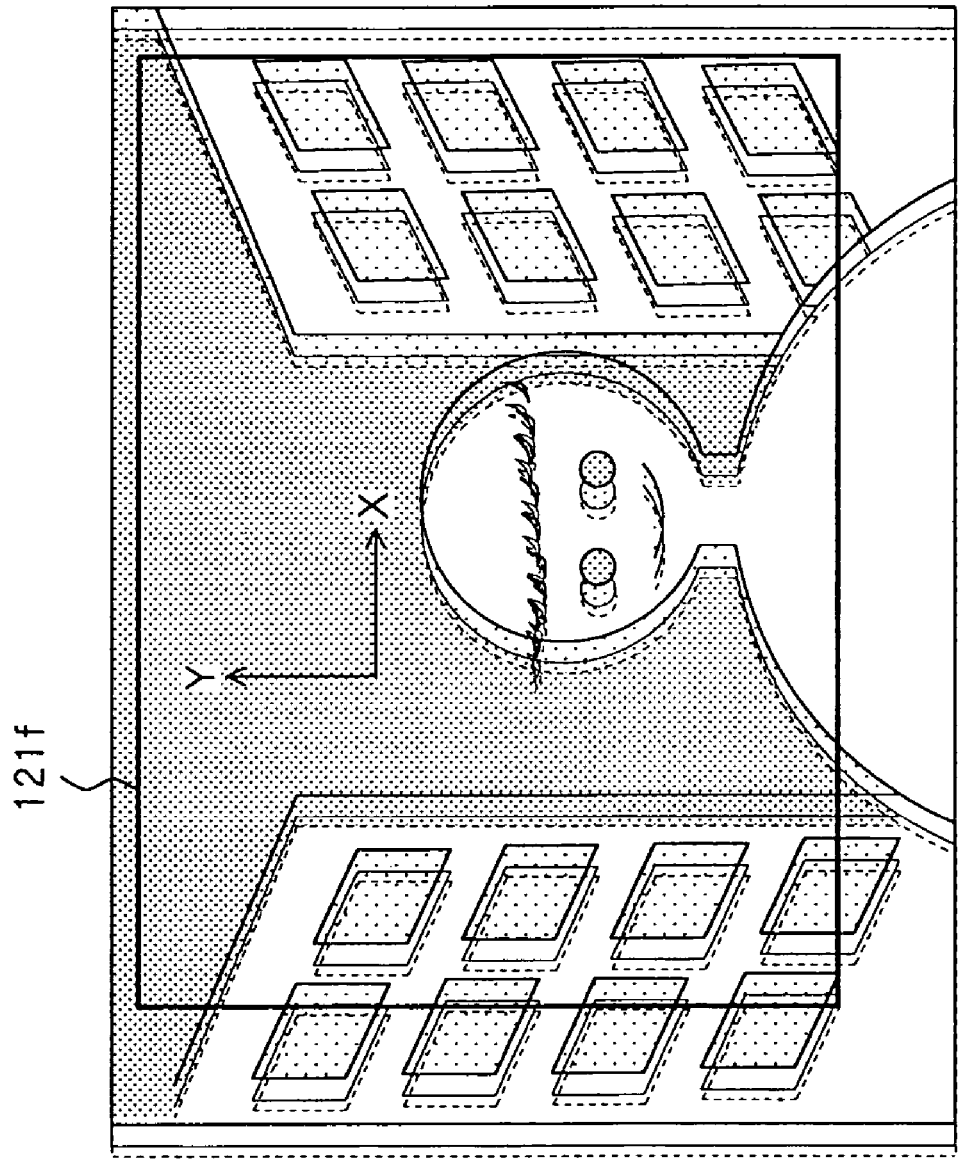
FIG. 9 is an explanatory view of the directions of the vibration isolation performance in Embodiment 1 of the present invention.

Herein, the X direction is the direction of the arrow X (the lateral direction of the image) in the image shown in FIG. 9. FIG. 9 shows the condition of an image when framing operation is widely carried out in the X direction.

At Step S1501, it is judged whether or not the motion vector in the X (horizontal) direction is smaller than a predetermined value a (value a is given value, for example, 1 deg/s).

When the motion vector in the X direction is smaller than the predetermined value a, the process advances to Step S1502, and otherwise the process advances to Step S1503.

At Step S1502, a high pass filter having first characteristics is applied to the motion vector signal obtained at Step S1004.

Figure 10:
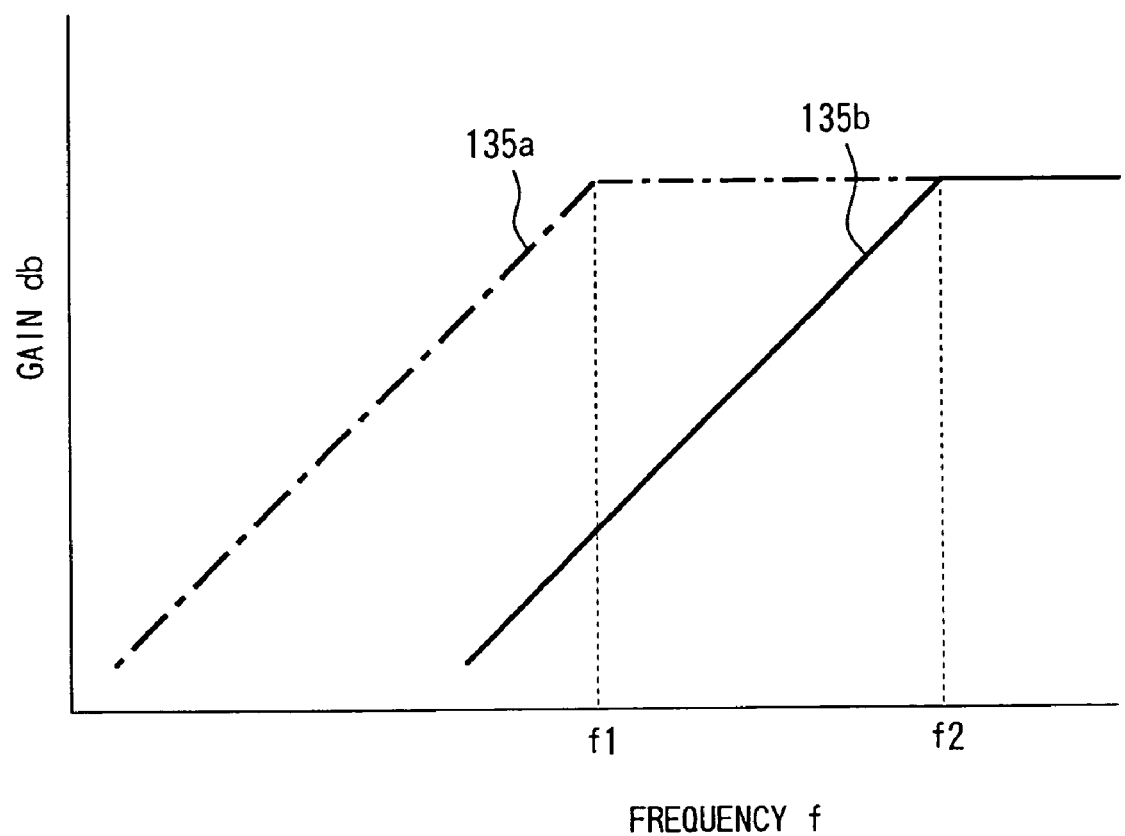
FIG. 10 is a drawing showing the vibration isolation performance in Embodiment 1 of the present invention.

FIG. 10 schematically shows the frequency characteristics of the high pass filter. Herein, the dashed line 135a shows the characteristics (first characteristics) of the high pass filter that eliminates (attenuates) a component having frequencies lower than a frequency f1 (for example, 0.3 Hz). The solid line 135b shows the characteristics (second characteristics) of the high pass filter that eliminates (attenuates) a component having frequencies lower than a frequency f2 (for example, 1.0 Hz).

In this embodiment, when the motion vector in the X direction is smaller than the predetermined value a, it is judged that framing operation of the camera is not carried out, and the high pass filter having a high time constant, that is, having lower elimination performance for low-frequency components is used.

At Step S1503, it is judged whether or not the motion vector in the X direction is smaller than a predetermined value b (the value b is given value and is larger than the value a, for example, 15 deg/s). Herein, when the motion vector is smaller than the predetermined value b, the process advances to Step S1504, and otherwise the process advances to Step S1505.

At Step S1504, the motion vector signal obtained at Step S1004 is filtered by the high pass filter that has the second characteristics described in FIG. 10.

When the magnitude of the motion vector increases to some extent (larger than the predetermined value a), it is judged that framing operation of the camera has been carried out, and a high pass filter having a small time constant, that is, having high elimination performance for low-frequency components is used.

The process advances to Step S1505 when the motion vector is great and the camera is panned. At Step S1505, the motion vector in the X direction is set to zero so as not to carry out vibration correction (coordinate conversion) with respect to the X direction. Thereby, the display on the display unit 118 can be made respondent to the motion of the camera, and a photographer can follow an object while observing the display on the display unit 118.

Next, judgement of the motion vector in the Y direction is carried out in the same manner as judgement of the motion vector in the X direction. Herein, the Y direction is the direction of the arrow Y in the image (the vertical direction of the image) shown in FIG. 9.

When the motion vector in the Y direction is smaller than the predetermined value a, the high pass filter having the first characteristics is used, and when the motion vector is larger than the predetermined value a and smaller than the predetermined value b, the high pass filter having the second characteristics is used. When the motion vector in the Y direction is larger than the predetermined values a and b, it is judged that the camera has been moved in the Y direction (tilting), and the motion vector in the Y direction is set to zero so as not to carry out vibration correction with respect to the Y direction. The abovementioned operations are shown at Steps S1506 through S1510.

After the processing of Step S1507, Step S1509, or Step S1510, the process advances to Step S1511.

At Step S1511, the position of an image pick-out region is set based on the motion vectors set in the abovementioned steps (Steps S1502, S1504, S1505, S1507, S1509, and S1510).

At Step S1512, the process ends this subroutine and returns to the main flow. When the processing of Step S1005 is finished, the process advances to Step S1006.

At Step S1006 of FIG. 7, an image is displayed on the display unit 118. As a display method used at this point, as in the display at the stage of object observation shown in FIG. 6(B), image display setting is made so that the image pick-out region determined at Step S1005 is positioned at the center of the display screen 130, and regions with image deficiencies (regions 131a and 131b) are masked.

At Step S1007, until the SW2 is turned on by full-depression of the release button, the process waits while repeating the operations of Steps S1001 through S1006. Here, displaying as shown in FIG. 6(B) is carried out by the display unit 118. At Step S1007, when the half depression of the release button is released and the SW1 is turned off, the process returns to start.

At Step S1008, the image taking control circuit 18 judges whether or not the current operation is of the first time of image acquiring. Herein, in the case of the first time of image acquiring, the process advances to Step S1010. When the current operation is not of the first time of image acquiring, the process advances to Step S1009.

At Step S1009, the first image is acquired by carrying out an image pickup operation without illumination light of the illumination unit 16a, and the process advances to Step S1012.

At Step S1010, a second image is acquired by carrying out an image pickup operation while making the illumination unit 16a to emit light, and the process advances to Step S1012. Herein, when the first time of image pickup operation is carried out, sound that informs the start of image taking is produced by driving a speaker 17a via a sound production drive circuit 17b. This sound may be an electronic sound of a beep, or may be a shutter opening sound, or a mirror raising sound in a single lens reflex camera.

At Step S1012, the displacement detection circuit 114 extracts a characteristic image (characteristic point) from a specific region (for example, the building 123a of FIG. 2) in the acquired image, and calculates the coordinates of the characteristic point.

In detail, a characteristic point is extracted from a region (that is, a region in which the object is not sufficiently irradiated with illumination light) other than a region (that is, a region in which the object is sufficiently irradiated with illumination light) having a brightness difference when comparing the first image and the second image with each other, and the coordinates of this characteristic point are calculated. At Step S1012, the first image obtained by using the illumination light of the illumination unit 16a is temporarily stored in the image storage circuit 113.

At Step S1013, the coordinate conversion circuit 115 applies coordinate conversion to the images. Herein, the image obtained by the first time of image taking operation, that is, the first image is not subjected to coordinate conversion and is defined as a reference image for coordinate conversion. Then, only the plurality of second images are subjected to coordinate conversion.

In coordinate conversion based on the motion vectors at the stage of image taking, filtering by using the high pass filter is not applied to the motion vector signals, so that high-accuracy motion detection (composition displacement detection) is carried out.

At Step S1013, when it is judged that framing operation of the camera is carried out based on the motion vector of the second images with respect to the first image, the motion vector is filtered by the high pass filter. Then, coordinate conversion is carried out based on the motion vector filtered by the high pass filter. When the camera motion is judged as great based on the motion vector, coordinate conversion is not carried out.

Figure 11:
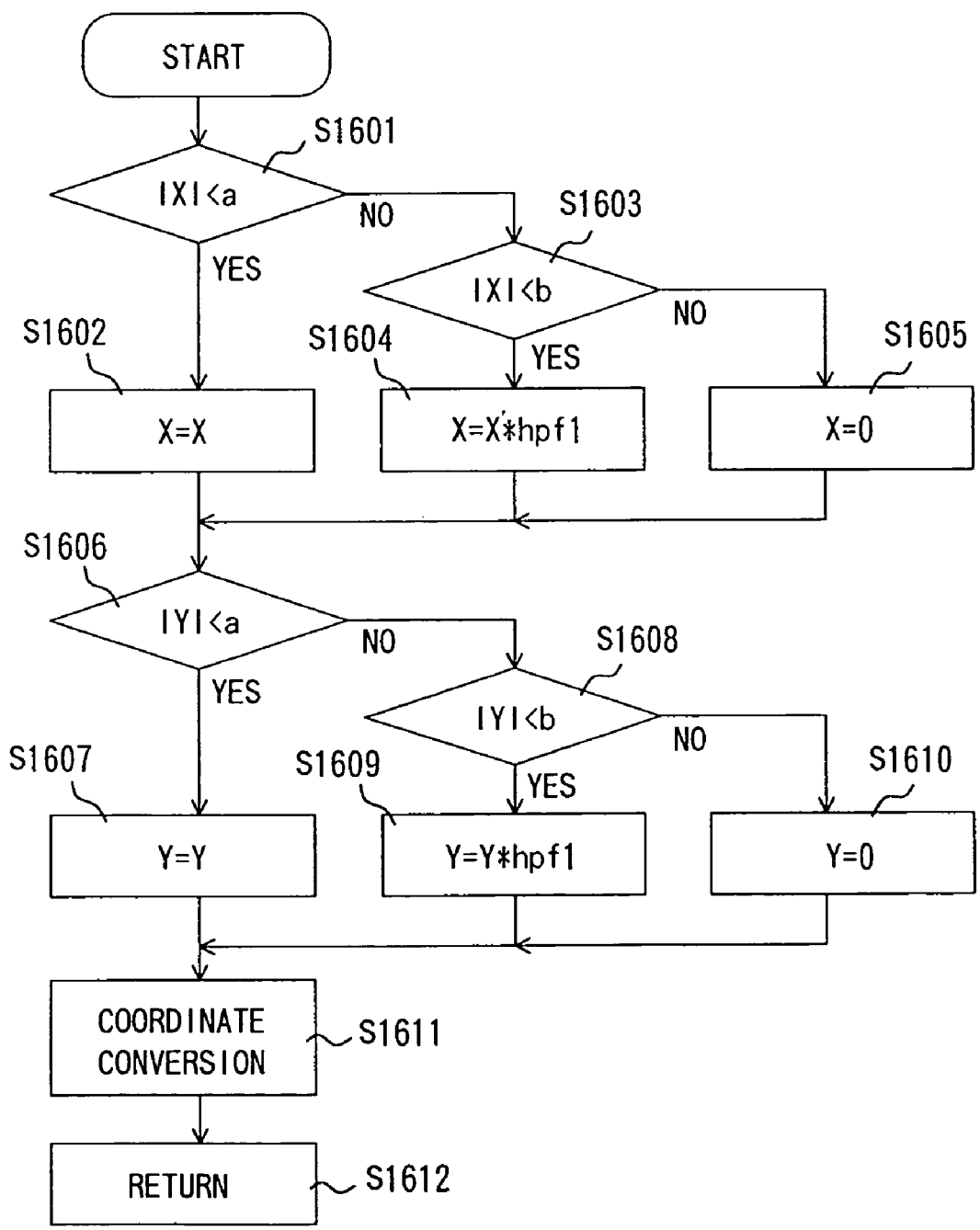
FIG. 11 is a subroutine showing actions of the high pass filter in Embodiment 1 of the present invention.

The operations at Step S1013 are described with reference to the flowchart of FIG. 11. FIG. 11 is a subroutine of Step S1013 of FIG. 7, and it starts when the process advances to Step S1013.

At Step S1601 of FIG. 11, the coordinate conversion circuit 115 judges whether or not the motion vector in the X direction in the motion vector determined based on the characteristic points in the first image and the second image is smaller than the predetermined value a (for example, 1 deg/s). When the motion vector in the X direction is smaller than the predetermined value a, the process advances to Step S1602, and otherwise the process advances to Step S1603.

At Step S1602, the motion vector value in the X direction is set as it is. Herein, as at Step S1005 (Step S1502 of FIG. 8), the motion vector in the X direction obtained at Step S1004 is not subjected to filtering by using the high pass filter having the first characteristics. When the motion vector in the X direction is thus smaller than the predetermined value a, it is judged that framing operation of the camera is not carried out and the high pass filter is not applied. Thereby, coordinate conversion is carried out based on the motion vector signal that has not been subjected to filtering by using the high pass filter, so that the composition displacement of the second image with respect the first image can be accurately corrected.

At Step S1603, it is judged whether or not the motion vector in the X direction is smaller than the predetermined value b (for example, 15 deg/s), and when it is smaller, the process advances to Step S1604, and otherwise the process advances to Step S1605.

At Step S1604, filtering using the high pass filter with the first characteristics shown in FIG. 10 is applied to the motion vector in the X direction. Herein, the high pass filter that has the first characteristics with a time constant higher than that of the high pass filter having the second characteristics used at Step S1005 (Step S1504 of FIG. 8) is used.

In this embodiment, by using a high pass filter even at the stage of image taking, response to framing operation of the camera is made possible. However, at the stage of image taking, in comparison with the stage of object observation, a composition displacement of the second image with respect to the first image is more accurately corrected without using a high pass filter or by using a high pass filter with a high time constant. The high pass filtering at the stage of image taking (processing from Steps S1601 through Step S1610 of FIG. 11) may be set to be the same as the high pass filtering at the stage of object observation (processing from Steps S1501 through S1510 of FIG. 8).

At Step S1605, the motion vector is set to zero so that the vibration isolation operation (composition displacement correction) with respect to the X direction is not carried out. Namely, when the motion vector in the X direction is larger than the predetermined value b, it is judged that image taking is carried out while panning the camera, and composition displacement correction is not carried out, whereby response to image taking with panning is made possible. Thus, when the camera is panned, the characteristics are set to be the same between the stage of object observation and the stage of image taking, and the motion vector is set to zero.

Next, the motion vector in the Y direction is also subjected to the same processing as that for the motion vector in the X direction. Namely, when the motion vector in the Y direction obtained at Step S1012 is smaller than the predetermined value a, the motion vector in the Y direction is set as it is. When the motion vector in the Y direction is larger than the predetermined value a and smaller than the predetermined value b, the high pass filter having the first characteristics is used. Furthermore, when the motion vector in the Y direction is larger than the predetermined values a and b, it is judged that the camera is moved in the Y direction (tilting), and the motion vector in the Y direction is set to zero so that vibration correction operation with respect to the Y direction is not carried out. The abovementioned operations are shown at Steps S1606 through S1610. After the processing of Step S1607, S1609, or S1610 is finished, the process advances to Step S1611.

At Step S1611, based on the motion vectors set in the abovementioned steps, coordinate conversion is applied to the second image. Herein, when the motion vectors in the X direction and Y direction are set to zero in the abovementioned Step S1605 and Step S1610, coordinate conversion is not applied to the second image.

At Step S1612, this subroutine is ended and the process returns to the main flow.

At Step S1014 of FIG. 7, the first image data stored in the image storage circuit 113 and the second image data subjected to coordinate conversion at Step S1013 are synthesized. Herein, image synthesis is carried out through averaging process for signals of corresponding coordinates of the images, and random noise in the images is reduced through averaging process.

When panning, etc., of the camera is carried out, the motion vectors are set to zero at Step S1013 (subroutine of FIG. 11), and coordinate conversion is not applied to the second image. Therefore, in this case, the first image and the second image that has not been subjected to coordinate conversion are synthesized.

Underexposure is corrected by image synthesis. Herein, in the first image, since the main object is irradiated with the illumination light of the illumination unit 16a, exposure in the region in which the main object is positioned is almost proper. Therefore, if a region in the second image corresponding to the region in the first image in which the main object is positioned is used for image synthesis, the region in which the main object is positioned may become overexposed.

However, the main object does not emit light by itself, and the region of the second image in which the main object is positioned (corresponding to the region of the first image irradiated with illumination light) is underexposed. Therefore, the region in which the main object is positioned rarely becomes overexposed even after the first image and the second image are synthesized.

However, when the first image and the second image are compared, the brightness is different in the region irradiated with the illumination light of the illumination unit 16a, so that the region of the second image corresponding to the region of the first image irradiated with illumination light is darkened, that is, the gain of the image signals in the abovementioned region of the second image is lowered, whereby the synthesized image can be repressed from being overexposed.

In this embodiment, when the first image data is acquired by the first time of image pickup operation, the first image data is stored in the image storage circuit 113, and when the second image data is acquired by the second time of image pickup operation, the second image data is subjected to coordinate conversion and then synthesized with the first image data. Then, second image data acquired by the third or subsequent image pickup operation is synthesized with the previously synthesized image data.

Figure 12:
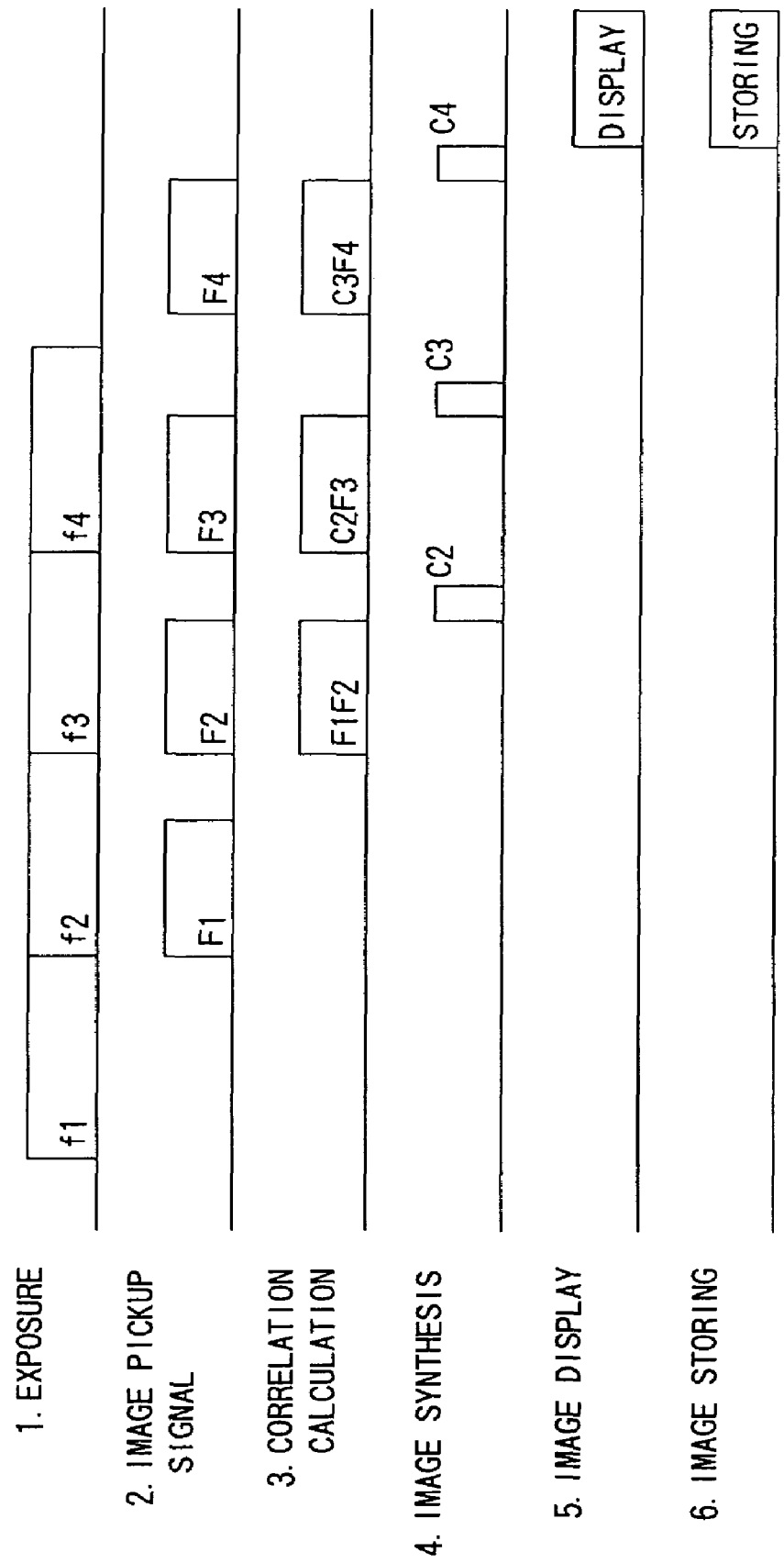
FIG. 12 is a timing chart showing image taking operations in Embodiment 1 of the present invention.

In this embodiment, image synthesis is carried out while acquiring images, and the timing of image synthesis is described with reference to the timing chart of FIG. 12. FIG. 12 describes the case where four images obtained by four times of image pickup operations are synthesized to obtain one synthesized image.

In FIG. 12, when the exposure operations shown by f1 through f4 are carried out, signals that have been photoelectrically converted and charged in the image pickup device 19 are readout from the image pickup device 19 as image pickup signals (F1 through F4). Only when the exposure operation shown by f1 is carried out, the illumination unit 16a emits light.

Herein, simultaneously with reading-out of the image pickup signal F2, a characteristic point change (motion vector) is calculated by calculation of correlation between the image pickup signal F1 (corresponding to the first image data) and the image pickup signal F2 (corresponding to the second image data), and based on this characteristic point change, the two image pickup signals F1 and F2 are synthesized to obtain a synthesized signal C2.

Next, along with reading-out of the image pickup signal F3 (corresponding to the second image data), a characteristic point change is calculated by correlation calculation of the synthesized signal C2 and the image pickup signal F3, and the synthesized signal C2 and the image pickup signal F3 are synthesized to obtain a synthesized signal C3.

Next, along with reading-out of the image pickup signal F4 (corresponding to the second image data), a characteristic point change is calculated by correlation calculation of the synthesized signal C3 and the image pickup signal F4, and the synthesized signal C3 and the image pickup signal F4 are synthesized to obtain a synthesized signal C4.

In the abovementioned timings, acquiring of the images (image pickup operations) and image synthesis are carried out. Herein, when a final synthesized signal C4 is generated, the synthesized signal C4 is outputted to the display unit 118 and displayed as a taken image, and also outputted to and recorded in the recording circuit 119.

At Step S1015 of FIG. 7, images are acquired by the number set at Step S1003, and it is judged whether or not the processing of Steps S1012 through S1014 are finished for all the images. Herein, when the processing are not finished for all the images, the process returns to Step S1008, and when the processing are finished for all the images, the process advances to Step S1016.

At Step S1016, by driving the speaker 17*a* via the sound production drive circuit 17*b*, a sound that informs completion of an image taking operation (the plurality of times of image pickup operations) is produced.

This sound may be an electronic sound such as a beep, or may be a shutter closing sound or a mirror lowering sound in a single lens reflex camera.

When a plurality of images are acquired as mentioned above, one set of sounds informing start and completion of image taking operation (two times of sound production including production of a sound when a first image is acquired and production of a sound after the final image is acquired) are produced. Also, when a taken image is acquired by a normal image taking operation (one time of image pickup operation), one set of sounds informing start and completion of the image taking operation are produced. Therefore, the number of sounds to be produced is the same in the case where one taken image is generated through a plurality of times of image pickup operations (image taking for image blur correction) and in the case where one taken image is generated by one time of image pickup operation (normal image taking), so that this does not give a photographer a sense of discomfort.

At Step S1017, when regions overlapping each other in a synthesized image, for example, four images are synthesized as shown in FIG. 12, a region in which all the four images overlap is set as an image pick-out region. Namely, a region in which all the images do not overlap (corresponding to the region 129 of FIG. 4) is cut. Herein, when the composition displacement of the second image with respect to the first image is small, the region to be cut becomes smaller and the image pick-out region becomes larger according to the cut region reduction.

Then, after the size of the image pick-out region is adjusted so as to have a proper aspect ratio, image display setting is made so that the image pick-out region is positioned at the center of the display screen of the display unit 118, and the region (the region 133 in FIG. 6(D)) other than the image pick-out region in the display screen is masked. Then, the image processed as mentioned above is displayed on the display unit 118.

At Step S1018, the image synthesis circuit 116 applies expansion and complement processing to the image so that the image pick-out region is restored to a predetermined image size.

At Step S1019, image data expanded and complemented at Step S1018 is recorded on a recording medium which is composed of, for example, a semiconductor memory and can be attached to and detached from the camera. Also, the first image data stored in the image storage circuit 113 is recorded in the recording circuit 119.

By thus recording the synthesized image and the first image, a photographer can select later the image whose exposure is proper in all regions (synthesized image) and the image whose exposure is almost proper in only the region irradiated with illumination light of the illumination unit 16*a* (first image).

At Step S1020, the process returns to start.

At the point of Step S1020, when the release button is depressed halfway and the SW1 is on, the process advances in the flow in sequence again, to Steps S1001, S1002, S1003, and S1004. When the release button is fully depressed and the SW2 is on at the point of Step S1020, the process does not return to start, but waits at Step S1020.

Embodiment 2

A camera of Embodiment 2 of the present invention is a modified example of the camera of Embodiment 1 described above.

Herein, the structure of the camera of this embodiment is almost the same as that described in Embodiment 1 (FIG. 1).

In Embodiment 1, the acquired images (first and second images) are compared in brightness, and a region with little brightness difference, that is, a region which is not irradiated with illumination light of the illumination unit 16*a* is set as a characteristic point extraction region. However, the characteristic point extraction region is not limited to the region that is not irradiated with illumination light. For example, a region other than a focus area provided within an image taking plane or a region other than a focused region can be set as a characteristic point extraction region.

The reason for this is that, since the main object (person) is superposed on a focus area when image taking, in order to extract a characteristic point from a region other than the region in which the main object is positioned, a region other than the focus area is set as a characteristic point extraction region.

Figure 13:
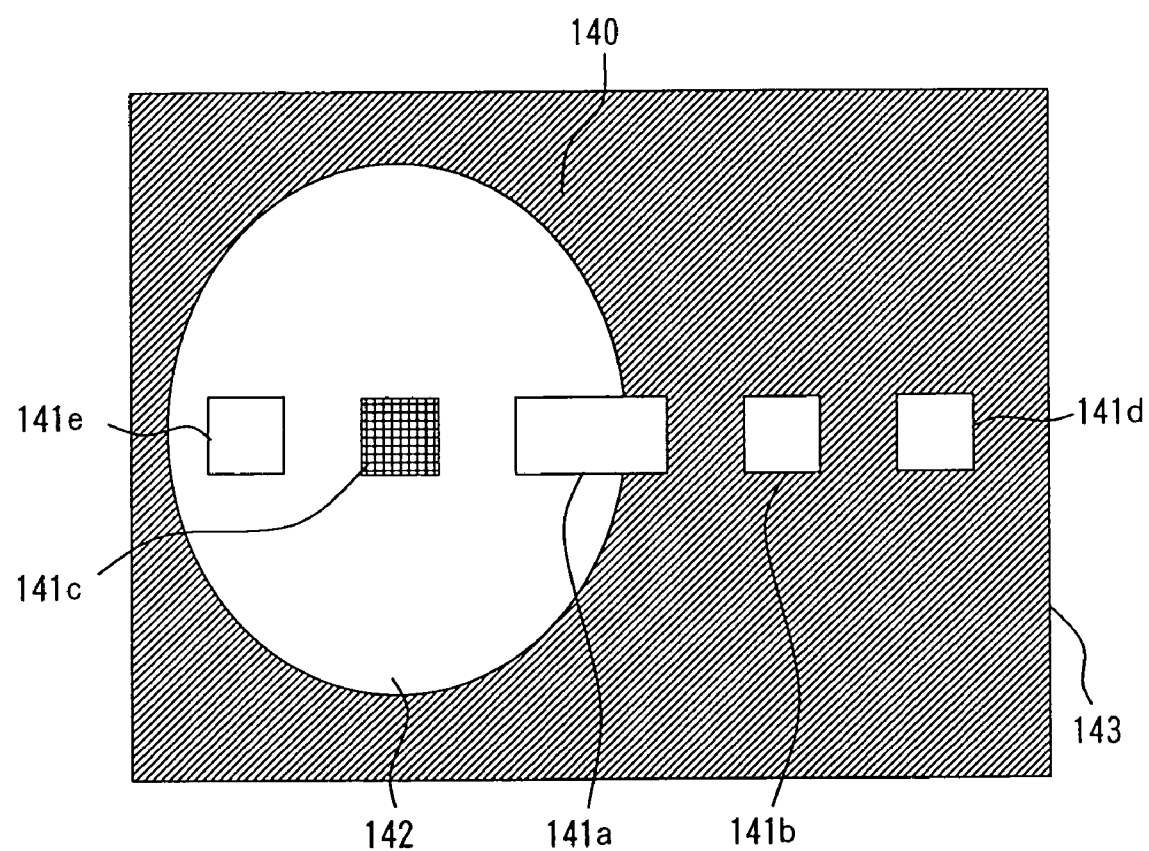
FIG. 13 is an explanatory view of a characteristic point extraction region in Embodiment 2 of the present invention.

FIG. 13 shows a characteristic point extraction region in an image taking plane. In the image taking plane 143, five focus areas 141*a*, 141*b*, 141*c*, 141*d*, and 141*e* are provided.

In FIG. 13, a condition where the main object is captured at the focus area 141*c* and the main object is focused at the focus area 141*c* is shown. Herein, a region having a predetermined extent around the focus area 141*c* is defined as a main object region 142, and a region except for the main object region 142 in the image taking plane 143 is defined as a peripheral region 140. The main object region 142 is a region in which the main object is highly possibly positioned. The peripheral region 140 is set as a characteristic point extraction region.

In this embodiment, depending on the focus area at which the object is focused among the focus areas 141*a* through 141*e*, the position of the main object region 142 changes and the peripheral region also changes.

Then an proper image is extracted as a characteristic point from the peripheral region of the acquired images, and after the displacement of the second image with respect to the first image is corrected (coordinate conversion) based on the characteristic point, the first image and the second image are synthesized, whereby a preferable taken image (synthesized image) without image blur can be obtained.

As described above, in Embodiment 1 and Embodiment 2, the vibration isolation performance, that is, the characteristics of the high pass filter for the motion vector are changed between the stage of object observation and the stage of image taking as described with reference to FIG. 8 and FIG. 11. Whereby, the image blur correction corresponding to the displayed image at the stage of the object observation, and the image blur correction corresponding to the taken image at the stage of image taking can be carried out.

Namely, in a camera having a vibration isolation system that suppresses image blur, at the stage of object observation, based on the motion vector signal between the images, the position of an image pick-out region (region to be displayed) is set for each image readout from the image pickup device 19, and the image pick-out region is displayed. At the stage of image taking, based on the motion vector signals among the images, the positions of image pick-out regions (regions to be synthesized) are set, and images in these image pick-out regions are synthesized, whereby exposure of video signals are apparently corrected. At the stage of image taking, the synthesized image is displayed, and the synthesized image is recorded in a recording medium.

Then, at the stage of object observation, in the displacement detection circuit 114, low-frequency components are eliminated from motion vector signals through filtering by using a high pass filter having characteristics that stress framing operation of the camera, and the positions of the image pick-out regions are set based on the motion vector signals from which the low-frequency components have been eliminated. Thereby, the image displayed at the stage of object observation can be made respondent to framing operation of the camera.

At the stage of image taking, in the displacement detection circuit 114, low-frequency components are eliminated from motion vector signals through filtering by using a high pass filter having characteristics that stress vibration isolation accuracy, and the positions of image pick-out regions are set based on the motion vector signals from which the low-frequency components have been eliminated. Then, images of the image pick-out regions are synthesized, whereby a synthesized image (taken image) whose exposure is corrected and which has little image blur can be obtained.

When the camera is moved at a speed higher than a predetermined speed, the characteristics of filtering for the motion vector with respect to the direction of this motion is switched to the first frequency characteristics from the second frequency characteristics (characteristics at the stage of object observation), whereby image taking as intended by a photographer becomes possible.

Furthermore, the areas of the image pick-out regions differ from each other between the stage of object observation and the stage of image taking, however, as described with reference to FIG. 6, the magnification of the image displayed on the display unit 118 is not changed. Namely, the image in the image pick-out region is displayed on the display unit 118 without changing the size of the image, and in the display screen 130 of the display unit 118, a region other than the image pick-out region is masked.

Thus, by setting the same magnification for both the displayed image at the stage of object observation and the taken image (synthesized image) at the stage of image taking, it can be repressed that a photographer feels discomfort.

Embodiment 3

The structure of a camera of Embodiment 3 of the invention is the same as that of the camera of Embodiment 1 (FIG. 1). The camera of this Embodiment is different from the camera of Embodiment 1, in terms of the characteristics of the high pass filter and the position of the image pick-out region, etc.

Figure 14:
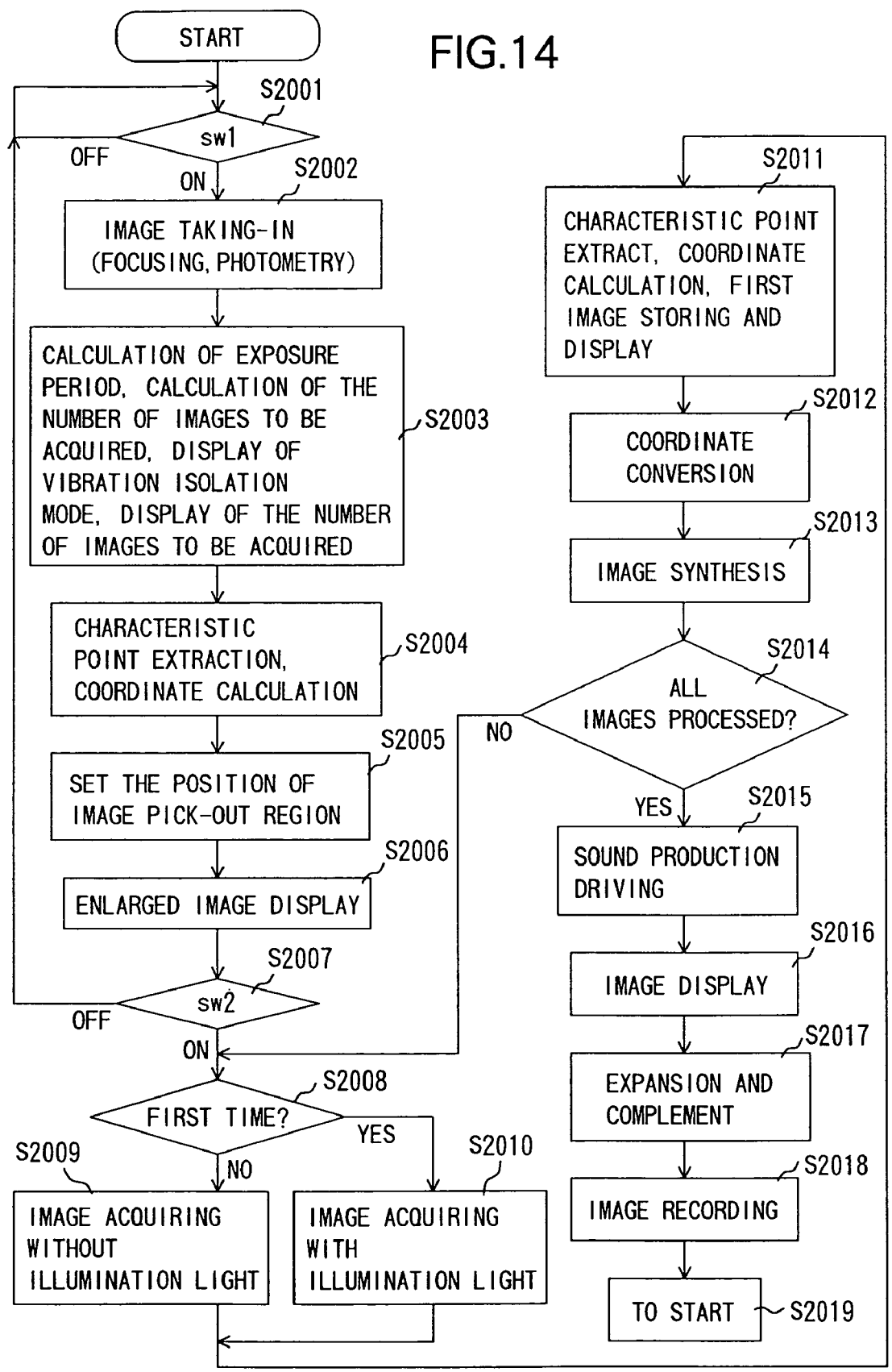
FIG. 14 is a flowchart showing image taking operations in Embodiment 3 of the present invention.

FIG. 14 is a flowchart showing image taking operation in the camera of this embodiment when the vibration isolation system is set to be on, and this flow starts when the power source of the camera is turned on.

At Step S2001, the process waits until the SW1 is turned on by half-depression of the release button, and when the SW1 is turned on, the process advances to Step S2002.

At Step S2002, an object image is picked up by using the image pickup device 19. The image taking control circuit 18 moves the image taking lens 11 in the optical axis direction by driving the AF drive motor 14*a* while detecting the contrast of the object image (image to be taken) based on an output from the signal processing circuit 111. Then, when the contrast becomes highest, the image taking optical system is turned into a focused state by stopping the driving of the image taking lens 11 (focusing by a so-called hill-climbing method). It is also possible that focusing operation is carried out by a phase difference detection method.

Furthermore, the image taking control circuit 18 calculates the brightness (luminance) of the object based on the output of the image pickup device 19.

At Step S2003, based on the brightness of the object obtained at Step S2002, the number of images to be acquired is determined. Thereafter, on a display unit provided within the finder of the camera or a liquid crystal display unit (corresponding to the display unit 118) provided on the outer package of the camera, information on the setting of the vibration isolation mode (mode in which a plurality of images are synthesized to generate a taken image) is displayed, and information on the number of times of image acquiring is displayed. A photographer can know the setting condition of the vibration isolation mode and the number of times of image acquiring by looking at the display on the display unit.

At Step S2004, the displacement detection circuit 114 extracts a characteristic image (characteristic point) from a specific region in an image, and calculates the coordinates of the characteristic point. The characteristic point can be extracted from, as described above, a region in which a still object is highly possibly positioned in the image (for example, a region in which the building 123*a* is positioned in FIG. 2).

At Step S2005, the coordinate conversion circuit 115 determines the position of an image pick-out region (region to be displayed) based on the coordinate of the characteristic point calculated at Step S2004.

Herein, as in Embodiment 1, low-frequency components are eliminated from a motion vector signal at the stage of object observation by a high pass filter. Thereby, as described in Embodiment 1, framing operation of the camera becomes easy.

Figure 15:
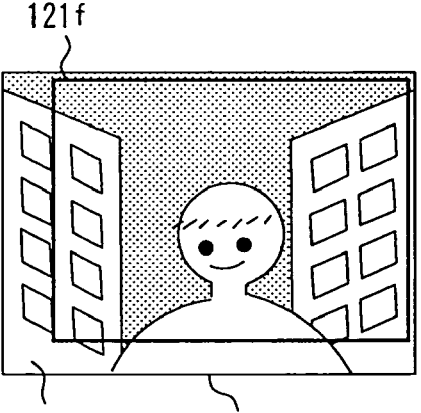
FIG. 15 is explanatory view of displays of images in Embodiment 3 of the present invention.

At Step S2006, an image is displayed on the display unit 118. A display method used herein is described with reference to FIG. 15.

FIG. 15(E) shows one image acquired through an image pickup operation by the image pickup device 19 at the stage of object observation. The region 121f shows a region (image pick-out region) which is picked out from one image region, and the position of the image pick-out region in the image is determined at Step S2005.

Herein, since the image in the image pick-out region is the same in all the first and second images, if the composition is displaced between the first image and the second image due to camera shake, the position of the image pick-out region in the second image changes.

Furthermore, depending on the composition displacement between the first image and the second image, the image pick-out region may fall within the second image, or the image pick-out region may protrude from the second image. Therefore, in this embodiment, in order to repress the image pick-out region from protruding from the second image, as shown in FIG. 15(E), the image pick-out region 121f is set to be a slightly smaller than the entire region of the image 121a.

FIG. 15(F) shows an image to be displayed on the display unit 118 at the stage of object observation. Herein, the image in the image pick-out region 121f is enlarged so that the size of the image pick-out region 121f becomes the same as that of the display screen 130 of the display unit 118, and the enlarged image is displayed on the display unit 118.

FIG. 15(G) and FIG. 15(H) show one image acquired at the stage of image taking and an image to be displayed on the display unit 118 at the stage of image taking, respectively.

At Step S2007, the process waits while repeating the processing of Steps S2001 through S2006 until the SW2 is turned on by full-depression of the release button. Herein, when the half depression of the release button is released and the SW1 is turned off, the process waits until the SW1 is turned on again at Step S2001.

At Step S2008, the image taking control circuit 18 judges whether or not the current operation is of the first time of image acquiring (first time of image pickup operation). Herein, when the operation is of the first time of image acquiring, the process advances to Step S2010. When the operation is not of the first time of image acquiring, the process advances to Step S2009.

At Step S2009, an image (second image) is acquired without emission from the illumination unit 16a, and the process advances to Step S2011.

At Step S2010, an image (first image) is acquired by making the illumination unit 16a to emit light, and the process advances to Step S2011. When the first image is acquired, the image taking control circuit 18 drives the speaker 17a via the sound production drive circuit 17b to produce a sound for starting image taking. This sound may be an electronic sound of a beep, or may be a shutter opening sound or a mirror raising sound in a single lens reflex camera.

At Step S2011, the displacement detection circuit 114 extracts characteristic images (characteristic points) from the first image and the second image, and calculates the coordinates of the characteristic points.

Furthermore, at Step S2011, the first image data acquired by making the illumination unit 16a to emit light is temporarily stored in the image storage circuit 113 and displayed on the display unit 118.

The display magnification at this point is different from the display magnification at the abovementioned stage of object observation. Hereinafter, this is described in detail with reference to FIG. 15.

FIG. 15(G) shows the first image 150 acquired at Step S2010, wherein the image pick-out region 121g is set so as to have an area that is larger than the area of the image pick-out region 121f at the stage of object observation and is almost equal to the entire region of the first image 150.

The reason for this is that there is no possibility of occurrence of great image blur at the stage of image taking in comparison with the stage of object observation. Herein, due to the large area of the image pick-out region, a taken image according to the image taking angle of view can be obtained.

Then, the image in the image pick-out region 121g is enlarged as shown in FIG. 15(H) so that it is displayed on the entirety of the display screen 130. Herein, the image pick-out region 121g is larger than the image pick-out region 121f, so that the enlarging magnification of the image pick-out region 121g becomes smaller than that of the image pick-out region 121f.

Furthermore, it is also possible that the area of the image pick-out region is changeable according to the exposure period, and the area of the image pick-out region is made smaller as the exposure period becomes longer so as to, for example, become closer to the area of the image pick-out region 121f at the stage of object observation.

FIG. 16A shows conditions of images acquired at the stage of object observation and at the stage of image taking. FIG. 16B and FIG. 16C are explanatory views of image pick-out regions with respect to the images obtained at the stage of object observation and at the stage of image taking. As shown in FIG. 16B and FIG. 16C, the image pick-out region 121g at the stage of image taking is larger than the image pick-out region 121f at the stage of object observation.

At Step S2011, the image 127 (first image) shown in FIG. 16A is displayed,on the display unit 118, and the image 127 is displayed until a synthesized image is displayed on the display unit 118 at Step S2016 described later. Herein, the first image is not subjected to the processing of Steps S2012 and S2013, and the process advances to Step S2014.

At Step S2012, the coordinate conversion circuit 115 applies coordinate conversion to the second image based on the characteristic points (motion vector) obtained at Step S2011.

In the same manner as at the stage of object observation, high pass filtering is also applied to the motion vector signal in coordinate conversion at the stage of image taking (Step S2012). The low-frequency component elimination performance in the characteristics of the high pass filter at the stage of image taking is lower than that in the characteristics of the high pass filter at the stage of object observation to increase accuracy of composition displacement correction.

In Embodiment 1, the high pass filtering is not applied to specific motion vector signals at the stage of image taking, however, in this embodiment, the high pass filtering is applied to the motion vectors at the stage of image taking. Namely, in FIG. 11 (in Embodiment 1), when the motion vectors in the X direction and the Y direction are smaller than the predetermined value a, the high pass filtering is not applied to the motion vectors, however, in this embodiment, the high pass filtering is applied even when the motion vectors in the X direction and the Y direction are smaller than the predetermined value a. This is for response to a case where framing operation of the camera is started from the stage of image taking.

As in Embodiment 1, when it is recognized that framing operation has been carried out from the stage of object observation (the camera has moved and so on), it is possible that, according to the magnitudes of the motion vectors, the low-frequency elimination performance of the high pass filter with respect to the motion vector signals in the direction of the motion is increased, or the motion vectors are not reflected on coordinate conversion, that is, the motion vector signals are set to zero.

At Step S2013, the first image and the second image that has been coordinate-converted are synthesized.

At Step S2014, it is judged whether or not the number of images (first and second images) corresponding to the number of times of image acquiring set at Step S2003 have been acquired and the processing of Steps S2011 through S2013 has been finished for these images. Herein, when the processing of Steps S2011 through S2013 is not finished for all the images, the process returns to Step S2008, and when the processing for all the images is completed, the process advances to Step S2015.

At Step S2015, the image taking control circuit 18 drives the speaker 17a via the sound production drive circuit 17b to produce a sound informing completion of the image taking operation.

At Step S2016, the image synthesized at Step S2013 is displayed on the display unit 118. Namely, as shown in FIG. 15(H), the image in the image pick-out region 121g is enlarged and displayed so that the image pick-out region 121g in the synthesized image 150 coincides with the display screen 130 of the display unit 118. At this point, the image (first image) that has been displayed at Step S2011 before being synthesized is switched into a synthesized image after being synthesized. Thereby, a photographer can observe the image after image synthesis and know the exposure improvement effect.

At Step S2017, the image in the image pick-out region 121g is subjected to expansion and complement processing so that the image is restored to a predetermined image size (original image size).

At Step S2018, the image data obtained at Step S2017 is recorded on a recording medium (not shown) that is composed of, for example, a semiconductor memory, etc., and can be attached to and detached from the camera, and the recording circuit 119.

Furthermore, at Step S2018, the first image data stored in the image storage circuit 113 is also recorded in the recording circuit 119. By thus recording the synthesized image and the first image, a photographer can compare the synthesized image whose exposure is proper in the entire region and the first image whose exposure is almost proper in only the region irradiated with illumination light. Then, by operating a select switch 200 provided on the camera, one of the synthesized image and the first image can be selected and the selected image can be used.

At Step S2019, the process returns to start.

As described above, in this embodiment, the high pass filtering is applied to specific motion vector signals not only at the stage of object observation but also at the stage of image taking. Thereby, when framing operation of the camera is started from the stage of image taking, response to framing operation is possible.

In this embodiment, the image pick-out region at the stage of image taking is set to be larger than that at the stage of object observation. By thus setting the image pick-out region at the stage of image taking to be large, a taken image (synthesized image) according to the image taking angle of view can be obtained.

Embodiment 4

In Embodiments 1 through 3, at the stage of object observation, exposure complement by image synthesis process is not carried out although vibration correction is carried out.

Generally, an image acquiring period at the stage of object observation is approximately 1/30 seconds, and an exposure period in each image pickup operation is set to 1/60 seconds or shorter.

Therefore, an object with a low luminance (for example, a night scene) becomes greatly underexposed, and an image displayed on the display unit 118 at the stage of object observation becomes dark. Herein, in order to brighten the displayed image, the gain of image pickup signals must be greatly raised when image taking or subsequent signal processing. However, if the gain of the image pickup signals is greatly raised, noise also increases, resulting in an undesirable image.

In Embodiment 4 of the present invention, exposure of the image displayed at the stage of object observation is corrected as proper as possible. In detail, image acquiring with a short exposure period (for example, 1/60 seconds) which does not result in image blur due to camera shake is repeated, and these images are synthesized to generate a synthesized image whose exposure has been complemented. Then, the abovementioned image synthesis operation is repeated, and generated synthesized images are successively displayed on the display unit 118.

In the abovementioned case, the total exposure period to generate one synthesized image becomes long, and the image display period (image renewal period) becomes long, so that this method is not suitable for display of a moving object. However, it is rare that a moving object is observed by using the display unit 118 under a dark environment in which the gain of the image pickup signals is so raised that noise poses a problem.

Therefore, in this embodiment, slight lengthening of the image display period is allowed so that the gain of the image pickup signals is repressed from being significantly raised and image deterioration due to noise is suppressed.

Furthermore, in this embodiment, according to the brightness of the object, the display mode at the stage of object observation is switchable between a first display mode (normal display mode) in which the plurality of images obtained through serial image pickup operations of the image pickup device 19 are successively displayed on the display unit 118 and a second display mode in which synthesized images are successively displayed on the display unit 118 as mentioned above. By thus making the display mode switchable between the first display mode and the second display mode according to the brightness of the object, the abovementioned problems in the display period and noise can be eliminated.

When a synthesized image is generated in the second display mode, based on motion vectors among the images before being synthesized, the position of the image pick-out region (synthesis reference position) in each image is changed. Then, a synthesized image is generated by synthesizing the plurality of images based on the image pick-out regions. At this point, the synthesized image is generated without high pass filtering to the motion vectors among the images before being synthesized. Thereby, a synthesized image without composition displacement can be obtained.

On the other hand, when generated synthesized images are successively displayed on the display unit 118, high pass filtering is applied to the motion vector signals among the images. Thereby, the display on the display unit 118 can be made respondent to framing operation of the camera.

Namely, in the second display mode, when a synthesized image to be displayed on the display unit 118 is generated from a plurality of images, a synthesized image without composition displacement is generated by omitting high pass filtering to the motion vector signals among the images. When synthesized images are successively displayed, high pass filtering is applied to the motion vector signals among the synthesized images, whereby the display on the display unit 118 is made respondent to the camera motion (the framing operation of the camera).

The abovementioned second display mode is described in detail with reference to FIG. 17.

Figure 17:
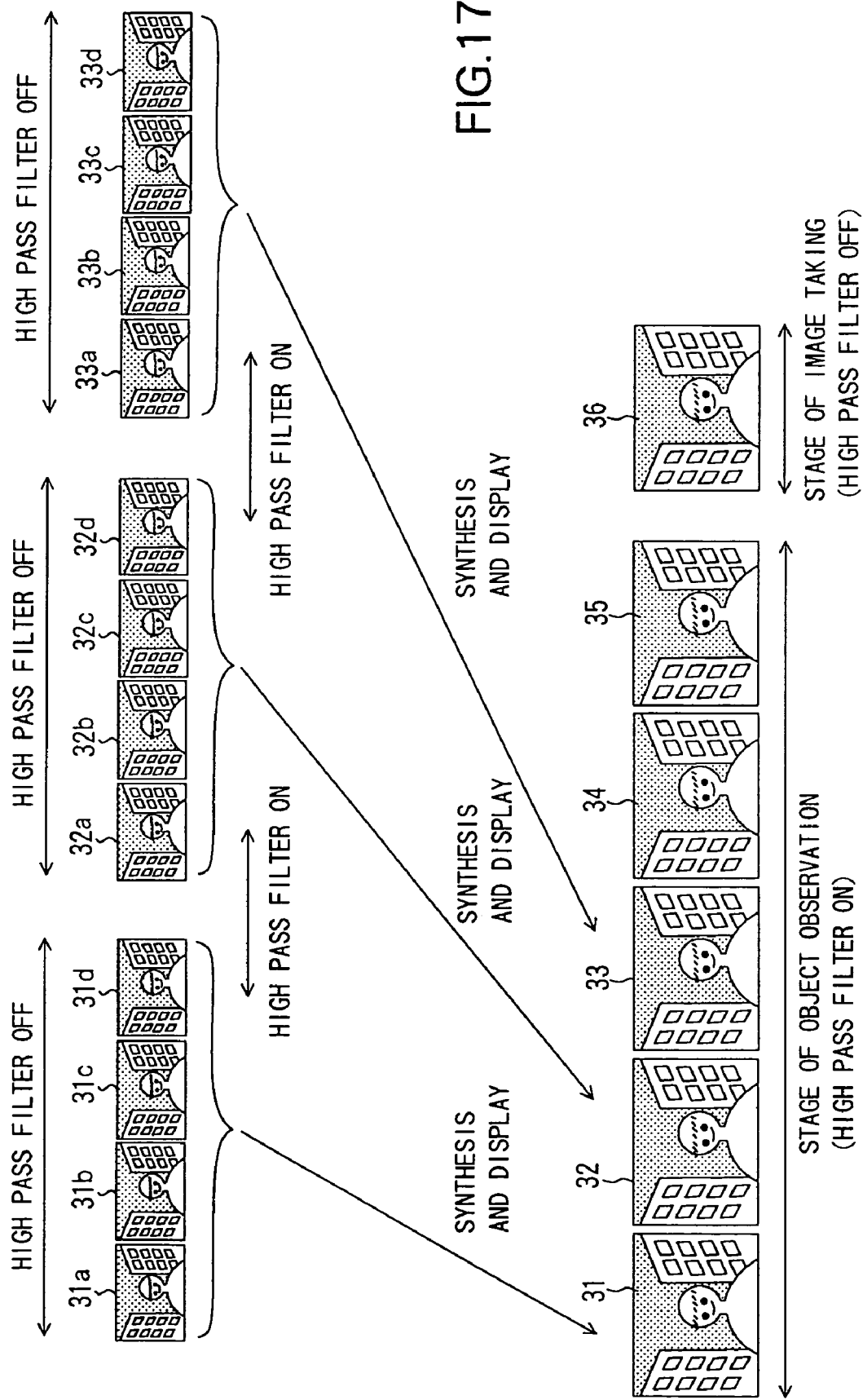
FIG. 17 is explanatory view of the vibration isolation performance in Embodiment 4 of the present invention.

Each of the three image groups shown at the upper side of FIG. 17 has four images (31a through 31d, 32a through 32d, and 33a through 33d), and these images are synthesized into one synthesized image (31, 32, 33). Each of the images to be synthesized is generated through an image pickup operation with an exposure period set to, for example, 1/60 seconds.

When the focal length of the image taking optical system is longer than a predetermined value, composition displacements among the images due to camera shake can be suppressed by shortening the exposure period. For example, when the focal length of the image taking optical system is 300 mm as regards 135 mm film, the exposure period is set to 1/300 seconds that is shorter than 1/60 seconds.

First, through a plurality of times of image pickup operations with short exposure periods, the four images 31a through 31d are generated. By detecting motion vectors among the four images, the position of the image pick-out region (region to be synthesized) in each image is set. Then, by synthesizing the images 31a through 31d based on the image pick-out regions, one image 31 is generated and displayed on the display unit 118.

Herein, the number of images to be acquired for synthesis is increased as the object becomes darker, if the number of images to be acquired is excessively increased, the renewal period of the displayed image on the display unit 118 becomes longer and the display on the display unit 118 becomes unnatural. Therefore, in this embodiment, image acquiring is stopped when a specific number of images (for example, four) are acquired, and when exposure is insufficient, the gain of the image pickup signals is raised to complement underexposure. In this case, noise in the synthesized image increases, however, in comparison with the case where the gain of image signals of one image is significantly raised, an image with less noise can be obtained.

Then, when the positions of the image pick-out regions are set, the positions are set so that the images in the image pick-out regions are the same among the images 31a through 31d before being synthesized. Furthermore, high pass filtering is not applied to the motion vector signals among the images 31a through 31d. Thereby, even when composition displacements exist among the images 31a through 31d before being synthesized, the synthesized image 31 without composition displacement (image blur) is obtained.

The synthesized image 31 is displayed on the display unit 118.

After the four images 31a through 31d are acquired, four images 32a through 32d are acquired by image pickup operations with short exposure periods. These images 32a through 32d are synthesized in the same manner as the abovementioned images 31a through 31d to generate a synthesized image 32. At the stage of synthesis of the images 31a through 31d, high pass filtering is not applied to the motion vector signals among the images, so that the synthesized image 32 without composition displacement is obtained. The synthesized image 32 is displayed on the display unit 118 in a predetermined period of time after the synthesized image 31 is displayed.

Herein, when the synthesized image 32 is displayed successively from the synthesized image 31, a motion vector between the two synthesized images is detected and the motion vector signal is subjected to high pass filtering, whereby the position of the image pick-out region (region to be displayed on the display unit 118) in the synthesized image 32 is set. Thereby, the display of the synthesized image on the display unit 118 can be made respondent to framing operation of the camera.

Furthermore, after the four images 32a through 32d are acquired, four images 33a through 33d are acquired by image pickup operations with short exposure periods. These images 33a through 33d are synthesized in the same manner as the images 31a through 31d to generate a synthesized image 33. At the stage of synthesis of the images 33a through 33d, high pass filtering is not applied to the motion vector signals among the images, so that a synthesized image 33 without composition displacement can be generated. The synthesized image 33 is displayed on the display unit 118 in a predetermined period of time after the synthesized image 32 is displayed.

Herein, when the synthesized image 33 is displayed continuously from the synthesized image 32, a motion vector between the two synthesized images is detected, and the motion vector signal is subjected to high pass filtering, whereby the position of the image pick-out region in the synthesized image 33 is set. Thereby, the display of the synthesized image on the display unit 118 can be made respondent to framing operation of the camera.

The synthesized images 34 and 35 are also generated by synthesizing a plurality of images generated through image pickup operations with short exposure periods, and are displayed in order of the synthesized image 34 and the synthesized image 35 after the synthesized image 33 is displayed.

As mentioned above, a plurality of times of image pickup operations with short exposure periods are carried out, and a plurality of images obtained thereby are used to generate synthesized images to be renewably displayed on the display unit 118, whereby exposure of the synthesized images (displayed images) is complemented. Furthermore, as mentioned above, since the high pass filtering is not applied to the motion vector signals among the images before being synthesized, so that each synthesized image has no composition displacement, and the synthesized images without composition displacement can be successively displayed on the display unit 118. When the synthesized images are successively displayed, high pass filtering is applied to motion vector signals among the synthesized images, whereby the display on the display unit 118 can be made respondent to framing operation of the camera.

In this embodiment, as in Embodiments 1 and 2, the low-frequency component elimination performance of the high pass filter for the motion vector signals among the synthesized images is changed according to the amount of camera motion (framing operation). Namely, the performance of high pass filtering for the motion vector signals is changed depending on whether the motion vector values are smaller or larger than a predetermined value.

Thereby, the display on the display unit 118 can be made respondent to framing operation of the camera and is made easily viewable.

On the other hand, at the stage of image taking, as in Embodiments 1 and 2, the exposure period and the number of images to be acquired are set according to the brightness of the object, the brightness of the image taking lens, the sensitivity of the image pickup device 19, and the focal length of the image taking optical system. Then, the obtained plurality of images are synthesized to generate one synthesized image (taken image) 36 whose exposure is proper.

Figure 18:
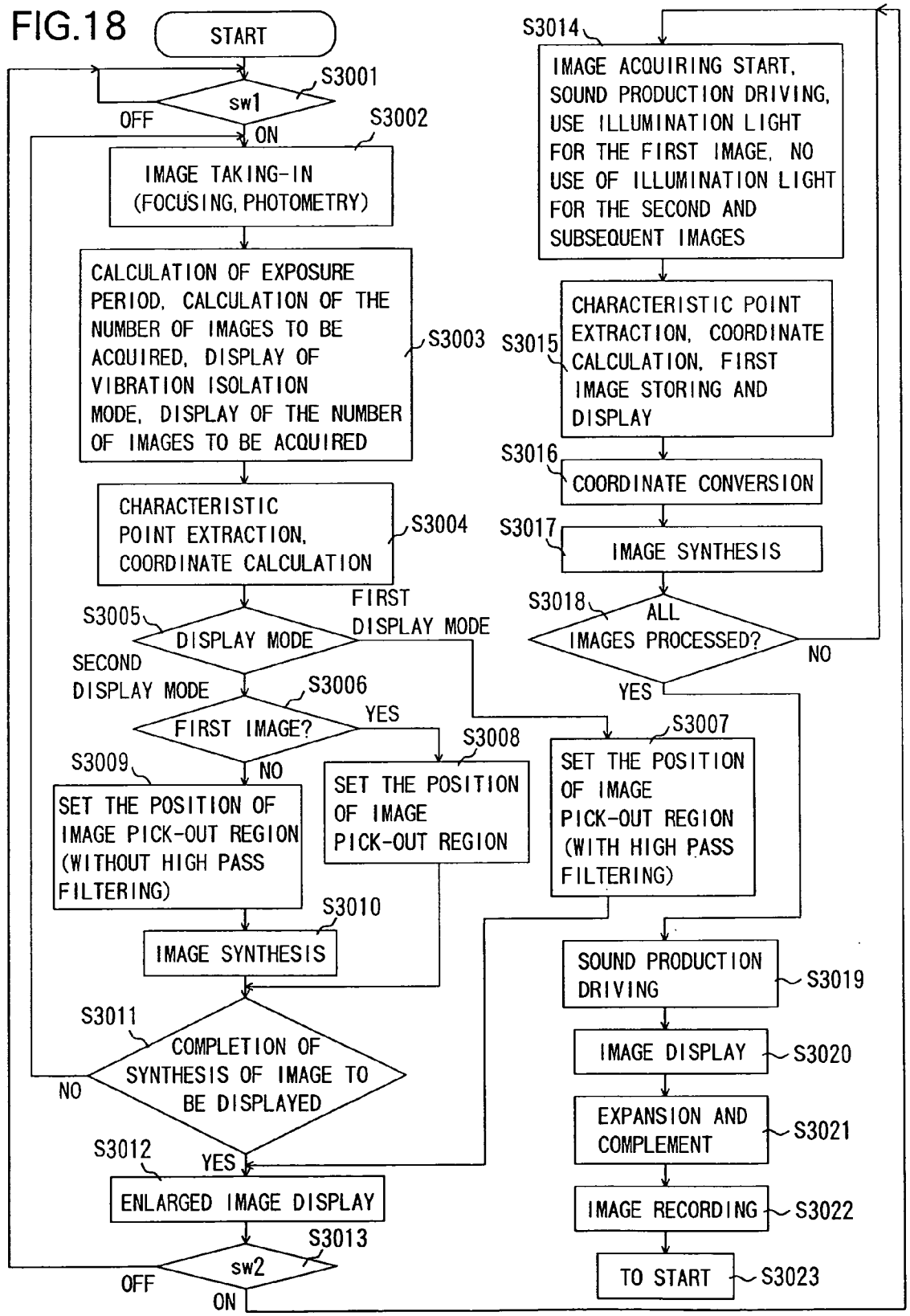
FIG. 18 is a flowchart showing image taking operation of a camera of Embodiment 4 of the present invention.

FIG. 18 is a flowchart summarizing the abovementioned operations, and this flow starts when the power source of the camera is turned on.

At Step S3001, the process waits until the SW1 is turned on by half-depression of the release button, and when the SW1 is turned on, the process advances to Step S3002.

At Step S3002, image pickup operations are started by using the image pickup device 19. The image taking control circuit 18 moves the image taking lens 11 in the optical axis direction by driving the AF drive motor 14*a* while detecting the contrast of an object image (image to be taken) on the basis of an output from the signal processing circuit 111. Then, when the contrast becomes highest, driving of the image taking lens 11 is stopped to turn the image taking optical system into a focused state (focusing by a so-called hill-climbing method). It is also possible that focusing is carried out by phase difference detection.

Furthermore, the image taking control circuit 18 calculates the brightness (luminance) of the object based on the output of the image pickup device 19 (photometry).

At Step S3003, the image taking control circuit 18 determines the number of images to be acquired and an exposure period for acquiring each image based on the image taking conditions including the brightness of the object, etc., calculated at Step S3002.

When the abovementioned calculation is finished, information on the setting of the vibration isolation mode (mode in which a taken image is obtained by synthesizing a plurality of images) and information on the number of images to be acquired are displayed on the display unit provided within the finder of the camera and a liquid crystal display unit provided on the outer package of the camera. A photographer can know the setting of the vibration isolation mode and the number of images to be acquired by looking at the displayed contents on the display unit.

In S3004, the displacement detection circuit 114 extracts a characteristic image (characteristic point) from a specific region in the image, and calculates the coordinates of the characteristic point. The characteristic point can be extracted from a region in which a still object is highly possibly positioned in the image (for example, the region in which the building 123*a* is positioned in FIG. 2) as mentioned above.

At Step S3005, the image taking control circuit 18 judges which display mode of the first display mode or the second display mode mentioned above should be set on the basis of the image taking conditions including the focal length of the image taking optical system and the photometry results (brightness of the object), etc., obtained at Step S3002.

Herein, for example, when telescopic image taking is carried out or the object is dark, the image taking control circuit 18 judges that the display mode should be set to the second display mode.

In the case of telescopic image taking, in order to suppress occurrence of image blur due to camera shake, the exposure period is set to be shorter (for example, 1/300 seconds) than a pre-set value (for example, 1/60 seconds), and an image pickup operation is carried out a plurality of times corresponding to the shortening of the exposure period to acquire a plurality of images (corresponding to the images 31*a* through 31*d*, 32*a* through 32*d*, and 33*a* through 33*d* of FIG. 17). Then, by synthesizing these images, synthesized images (corresponding to the synthesized images 31 through 33 of FIG. 17) whose exposure has been corrected are generated.

When the object is very dark, the exposure period is not changed from the pre-set value (for example, 1/60 seconds) and a plurality of times of image pickup operations are carried out to acquire the plurality of images (corresponding to 31*a* through 31*d*, 32*a* through 32*d*, and 33*a* through 33*d* of FIG. 17), and by synthesizing these images, synthesized images (corresponding to the synthesized images 31 through 33 of FIG. 17) whose exposure has been corrected are generated.

On the other hand, for example, when telescopic image taking is not carried out or the object is not dark, the image taking control circuit 18 judges that the display mode should be set to the first display mode. In the first display mode, every time an image is acquired by an image pickup operation of the image pickup device 19, the image is displayed on the display unit 118.

At Step S3005, when it is judged that the display mode should be set to the second display mode, the second display mode is set and the process advances to Step S3006. On the other hand, when it is judged that the display mode should be set to the first display mode, the first display mode is set and the process advances to Step S3007.

At Step S3007, the coordinate conversion circuit 115 determines the position of an image pick-out region (region to be displayed) on the basis of the coordinates of the characteristic point calculated at Step S3004.

Herein, in the first display mode, in order to make the display on the display unit 118 respond to framing operation of the camera, based on signals from which the low-frequency components have been eliminated (high pass filtering is carried out) in the motion vector signals among the images to be displayed on the display unit 118, the position of the image pick-out region is set.

At Step S3012, an image is displayed on the display unit 118. The display method employed herein is the same as in Embodiment 3, wherein the image in the image pick-out region is enlarged and displayed so that the image pick-out region set at Step S3007 conforms to the display screen of the display unit 118.

At Step S3006, it is judged whether or not the image is the image acquired first (corresponding to the image 31*a*, 32*a*, or 33*a* of FIG. 17) among a plurality of images (corresponding to the images 31*a* through 31*d*, 32*a* through 32*d*, or 33*a* through 33*d* of FIG. 17) for obtaining a synthesized image to be displayed on the display unit 118. In the case of the first acquired image, the process advances to Step S3008, and otherwise the process advances to Step S3009.

At Step S3008, based on a motion vector obtained by comparison with a synthesized image which was previously displayed, the position of an image pick-out region (region to be displayed) in the first acquired image is determined.

Herein, for response to framing operation of the camera, on the basis of the motion vector signal subjected to high pass filtering, the position of the image pick-out region (display reference position) is determined. After determination of the position of the image pick-out region, the process advances to Step S3011.

The process advances to Step S3009 when images (hereinafter, referred to as other images) other than the first acquired image of the plurality of images to be synthesized are processed. At Step S3009, on the basis of motion vectors of other images with respect to the first acquired image, the positions of the image pick-out regions (regions to be synthesized) in the other images corresponding to the image pick-out region in the first acquired image are determined.

Herein, in order to obtain a synthesized image without image blur as mentioned above, the high pass filtering is not applied to the motion vector signals, and based on motion vector signals that have not been subjected to high pass filtering, the positions of the image pick-out regions in the other images are determined.

At Step S3010, the image synthesis circuit 116 carries out image synthesis by overlapping the respective image pick-out regions in the other images with the image pick-out region in the first acquired image.

At Step S3011, in the second display mode, it is judged whether or not a synthesized image to be displayed on the display unit 118 has been obtained. For example, it is judged whether or not the synthesized image 31 has been obtained by synthesizing the four images 31a through 31d as shown in FIG. 17. Herein, when the synthesized image to be displayed is obtained, the process advances to Step S3012, and otherwise the process returns to Step S3002 and the remaining images are acquired.

Herein, the number of images to be synthesized for obtaining a synthesized image to be displayed in the second display mode is described. When an image corresponding to an image acquired by one time of image pickup operation with an exposure period of 1/10 seconds is obtained by an image pickup operation with an exposure period of 1/60 seconds, the image pickup operation is carried out six times, and the obtained six images are synthesized. Namely, the total exposure period when the plurality of times of image pickup operations are carried out is set equal to the exposure period in the case carrying out one time of image pickup operation.

However, in a case where a moving image is displayed on the display unit 118 at the stage of object observation, if the number of image pickup operations for obtaining a synthesized image is large, the renewal period of the image on the display unit 118 becomes longer, resulting in an undesirable moving image.

Therefore, in this embodiment, without regard for equalizing of the total exposure period as mentioned above, an image pickup operation with an exposure period of 1/60 seconds is carried out three times and three images thus obtained are synthesized to correct exposure. Then, in regards to the shortfall in exposure, it is compensated in such a manner that the gain of the synthesized image signal is raised.

At Step S3012, the image synthesized at Step S3010 is displayed on the display unit 118. The display method used herein is the same as in Embodiment 3, wherein the image in the image pick-out region is enlarged and displayed so that the image pick-out region synthesized at Step S3010 conforms to the display screen of the display unit 118.

At Step S3013, the process waits until the SW2 is turned on by full depression of the release button. When the half depression of the release button is released and the SW1 is responsively turned off, the process waits until the SW1 is turned on again at Step S3001.

Herein, a supplementary explanation is given for the case of return to Step S3001. When the process returns to Step S3001, acquiring of the image to be displayed at the stage of object observation is started at Step S3002. Then, when the second display mode is set at Step S3005 and the process advances to Step S3006, it is judged that the image acquired at Step S3002 is the first acquired image of the plurality of images to be synthesized.

At Step S3006, when the acquired image is the other image, in order to generate a synthesized image without composition displacement, a motion vector signal of the other image with respect to the first acquired image is not subjected to high pass filtering, and the position of an image pick-out region in the other image is set based on the actual motion vector signal.

On the other hand, when the acquired image is the first one, a motion vector signal of the first acquired image with respect to the image (synthesized image) displayed immediately prior to the first acquired image is subjected to high pass filtering, and based on the motion vector signal subjected to high pass filtering, the position of an image pick-out region in the first acquired image is set.

Hereinafter, a detailed description is given with reference to FIG. 17.

When the positions of image pick-out regions in the respective images 31a through 31d are set, motion vector signals among the images are not subjected to high pass filtering, and when the position of an image pick-out region in the respective image 32a is set, a motion vector signal of the image 32a with respect to the synthesized image 31 is subjected to high pass filtering.

Likewise, when the positions of image pick-out regions in the images 32a through 32d are set, motion vector signals among the images are not subjected to high pass filtering, and when the position of an image pick-out region in the image 33a is set, a motion vector signal of the image 33a with respect to the synthesized image 32 is subjected to high pass filtering.

Thus, for an image acquired first in one image group, a motion vector is calculated by calculation of correlation with a synthesized image of an image group acquired prior to the one image group, and low-frequency components in the motion vector signal are eliminated by high pass filtering. Then, based on the motion vector signal from which the low-frequency components have been eliminated, an image pick-out region in the image acquired first in the one image group is set.

At Step S3014, image pickup operations for obtaining a taken image is started.

Herein, in the case of the first time of image pickup operation, as in Embodiment 1, the image pickup operation is carried out by making the illumination unit 16a emit light to acquire the first image. At this step, the image taking control circuit 18 makes the speaker 17a produce a sound informing the start of image taking by driving the speaker 17a via the sound production drive circuit 17b.

On the other hand, in the case of the second and subsequent image pickup operations, the -second images are acquired by carrying out the image pickup operations without emission of light from the illumination unit 16a. When acquiring of the first or second image is finished, the process advances to Step S3015.

At Step S3015, the displacement detection circuit 114 extracts a characteristic image (characteristic point) from the first image and the second images, and calculates the coordinates of the characteristic point. The characteristic point extraction method is the same as in Embodiment 1, etc., described above.

Furthermore, at Step S3015, the first image acquired by using the illumination unit 16a is temporarily stored in the image storage circuit 113 and displayed on the display unit 118.

At Step S3016, the coordinate conversion circuit 115 applies coordinate conversion to the second images.

In coordinate conversion of Step S3016, different from the coordinate conversion at the stage of object observation, motion vector signals are not subjected to high pass filtering. Thereby, based on the motion vectors, composition displacements of the respective second images with respect to the first image can be accurately corrected, and a synthesized image (taken image) without image blur can be obtained.

At Step S3017, the first image and the second images are synthesized.

At Step S3018, it is judged whether or not images according to the number of images to be acquired, determined at Step S3003, have been subjected to the processing of Steps S3014 through S3017. Herein, when the processing is not finished for all the images, the process returns to Step S3014, and the processing of Steps S3014 through S3017 is repeated until the processing is applied to all the images.

In image synthesis at the stage of object observation, as mentioned above, the renewal period of the displayed image is prioritized, and the number of times of image pickup operations is reduced to suppress the renewal period of the displayed image from becoming longer. On the other hand, in image synthesis at the stage of image taking, the renewal period of the displayed image is not prioritized, and a plurality of times of image taking operations are carried out so that the total exposure period becomes equal to the pre-set exposure period, and the plurality of images thus obtained are synthesized.

At Step S3019, the image taking control circuit 18 makes the speaker 17a to produce a sound informing the image taking completion by driving the speaker 17a via the sound production drive circuit 17b.

At Step S3020, the synthesized image finally obtained at Step S3017 is displayed on the display unit 118. Herein, the first image is displayed on the display unit 118 in advance by the processing of Step S3015, so that the display on the display unit 118 is switched from the first image to the synthesized image by the processing of Step S3020. A photographer can know that the exposure has been corrected in the synthesized image by looking at the switching from the first image to the synthesized image.

At Step S3021, in order to restore the image in the image pick-out region of the synthesized image to a predetermined image size (original image size), the image in the image pick-out region is subjected to expansion and complement processing.

At Step S3022, the synthesized image obtained at Step S3021 is recorded on a recording medium which is composed of, for example, a semiconductor memory and can be attached to and detached from the camera. The first image data stored in the image storage circuit 113 is recorded in the recording circuit 119.

By thus recording the synthesized image whose exposure is proper in the entire region and the first image whose exposure is almost proper in only the region irradiated with illumination light, a photographer can select the synthesized image and the first image.

At Step S3023, the process returns to start.

In this embodiment, as described above, the quality of the displayed image at the stage of object observation is improved. Particularly, improvement in the vibration isolation accuracy and usability of the camera are both realized by changing the performance of vibration isolation (processing to motion vector signals) between the interval for image synthesis, that is, the interval in which the abovementioned one image group is acquired and the interval for acquiring the next images as a moving image, that is, the interval between two image groups.

Namely, in a camera which periodically carries out synthesis of a plurality of images, displacement detection performance when a plurality of images are acquired in one period and periodical displacement detection performance are made different from each other. Herein, with respect to the periodical displacement detection performance, low-frequency vibration signals are attenuated in detected vibration signals (motion vector signals) by high pass filtering. Furthermore, with respect to the displacement detection performance in one period, low-frequency vibration signals are not attenuated in detected vibration signals (motion vector signals). Thereby, the vibration isolation accuracy for a synthesized image obtained in one period can be improved, and the usability of the camera can be improved by making images that are periodically renewed to respond to framing operation of the camera.

Embodiment 5

The present invention can be applied not only to digital still cameras but also video cameras. However, the image taking period in a video camera cannot be lengthened even when an object is dark due to restrictions relating to reproduction equipment.

However, when image taking is carried out with an exposure period 1/60 seconds of a normal exposure period in image taking conditions such as telescopic image taking, image blur is easily caused by camera shake. Therefore, the exposure period is shortened to a degree which does not result in image blur, and an image pickup operation with this exposure period is carried out a plurality of times, whereby a plurality of images are acquired. Then, these images are synthesized by conforming characteristic points among the images, whereby exposure is corrected and an image with less image blur can be obtained. Herein, by changing the vibration isolation performance between when the images are synthesized and when the image is renewed (moving image), the improvement in the vibration isolation effect and usability of the camera can be made compatible.

The camera of this embodiment is described with reference to FIG. 19. The structure of the camera of this embodiment is almost the same as that of the camera described in Embodiment 1.

Figure 19:
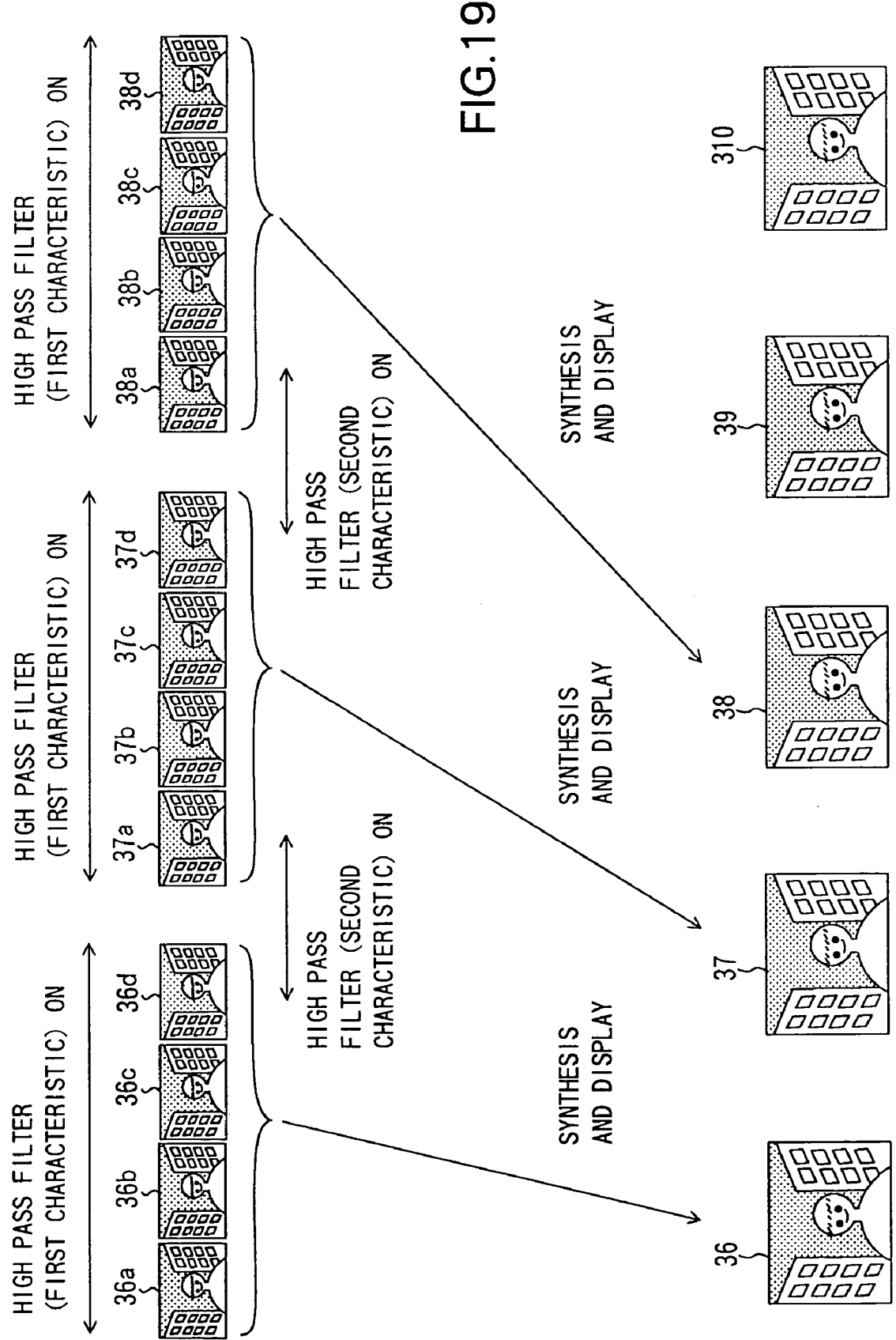
FIG. 19 is explanatory view of the vibration isolation performance in Embodiment 5 of the present invention.

Three image groups shown at the upper side of FIG. 19 include four images, respectively, and the exposure period to acquire each image is set to, for example, 1/300 seconds. For suppressing image blur caused by camera shake when the focal length of the image taking optical system is 300 mm as regards 135 mm film, the exposure period is set to correspond to one over the focal length.

First, an image pickup operation with the set exposure period is carried out four times to generate four images 36a through 36d. Motion vectors among the images 36a through 36d are detected, and based on the motion vectors, image pick-out regions (regions to be synthesized) are set. Then, the four images 36a through 36d are synthesized by conforming the image pick-out regions, whereby one synthesized image 36 is generated.

Herein, when an object is dark, in order to correct the exposure, the number of images for synthesis to be acquired increases, however, an excessive increase in the number of images to be acquired lengthens the image renewal period of the display unit 118, resulting in unnatural display on the display unit 118.

Therefore, in this embodiment, image acquiring is stopped when a specific number (for example, four) of images are acquired, and underexposure is corrected by raising the gain of image pickup signals. In this case, although noise in the image (synthesized image) increases according to the gain rise, an image with noise less than in the abovementioned case where the gain of the image pickup signal is significantly raised can be obtained.

In this embodiment, in a case where one synthesized image to be displayed is generated, when the positions of the image pick-out regions (regions to be synthesized) are set, different from Embodiment 4, motion vector signals among the images resulting from camera shake are subjected to high pass filtering. The reason for this is that some remaining low-frequency components in the motion vector signals can smooth the display switching and realize natural image display.

Therefore, in the case where one synthesized image to be displayed is generated, for high pass filtering for the motion vector signals, a high pass filter is used which has the first characteristics that eliminate frequency components lower than the frequency f1 as shown by the dashed line 135a of FIG. 10.

The synthesized image is displayed on the display unit 118. During display of the synthesized image 36, the images 37a through 37d are acquired, and these images 37a through 37d are synthesized to generate a synthesized image 37. Even at the stage of image synthesis, motion vectors among the images to be synthesized are subjected to high pass filtering.

When the synthesized image 37 is displayed successively from the synthesized image 36, a motion vector between the two synthesized images is detected, and to this motion vector signal, high pass filtering is applied. Then, based on the motion vector signal subjected to high pass filtering, the position of an image pick-out region (region to be displayed) in the synthesized image 37 is set. Thereby, the displayed image can be made respondent to framing operation of the camera.

In high pass filtering for the motion vector signal between the synthesized images, a high pass filter is used which has the second characteristics for elimination of frequency components lower than the frequency f2 as shown by the solid line 135b of FIG. 10. As shown in FIG. 10, the high pass filter having the second characteristics has a smaller time constant and greater low-frequency elimination performance in comparison with the high pass filter having the first characteristics.

The synthesized image 38 is also generated in the same manner by using images 38a through 38d acquired in advance during display of the synthesized image 37. Even at the stage of generation of the synthesized image 38, high pass filtering is applied to the motion vector signal among the images 38a through 38d.

When the synthesized image 38 is displayed successively from the synthesized image 37, a motion vector between the two synthesized images is detected, and this motion vector signal is subjected to high pass filtering. Then, based on the motion vector signal subjected to high pass filtering, an image pick-out region (region to be displayed) in the synthesized image 38 is set. Thereby, the displayed image can be made respondent to framing operation of the camera.

In high pass filtering for the motion vector signal between the synthesized images, a high pass filter having the second characteristics for elimination of frequency components lower than the frequency f2 as shown by the solid line 135b of FIG. 10 is used.

In this embodiment, images with complemented exposure and high vibration isolation accuracy (synthesized images 36 through 310) can be displayed, and the displayed images can be made respondent to framing operation of the camera.

Herein, the characteristics of the high pass filtering for the motion vector signal between the displayed images (frequency elimination performance) may be changed according to the amount of motion (framing operation) of the camera as in Embodiments 1 through 3. Thereby, preferable images responding to framing operation of the camera can be displayed, and the camera can be made easier to use.

Figure 20:
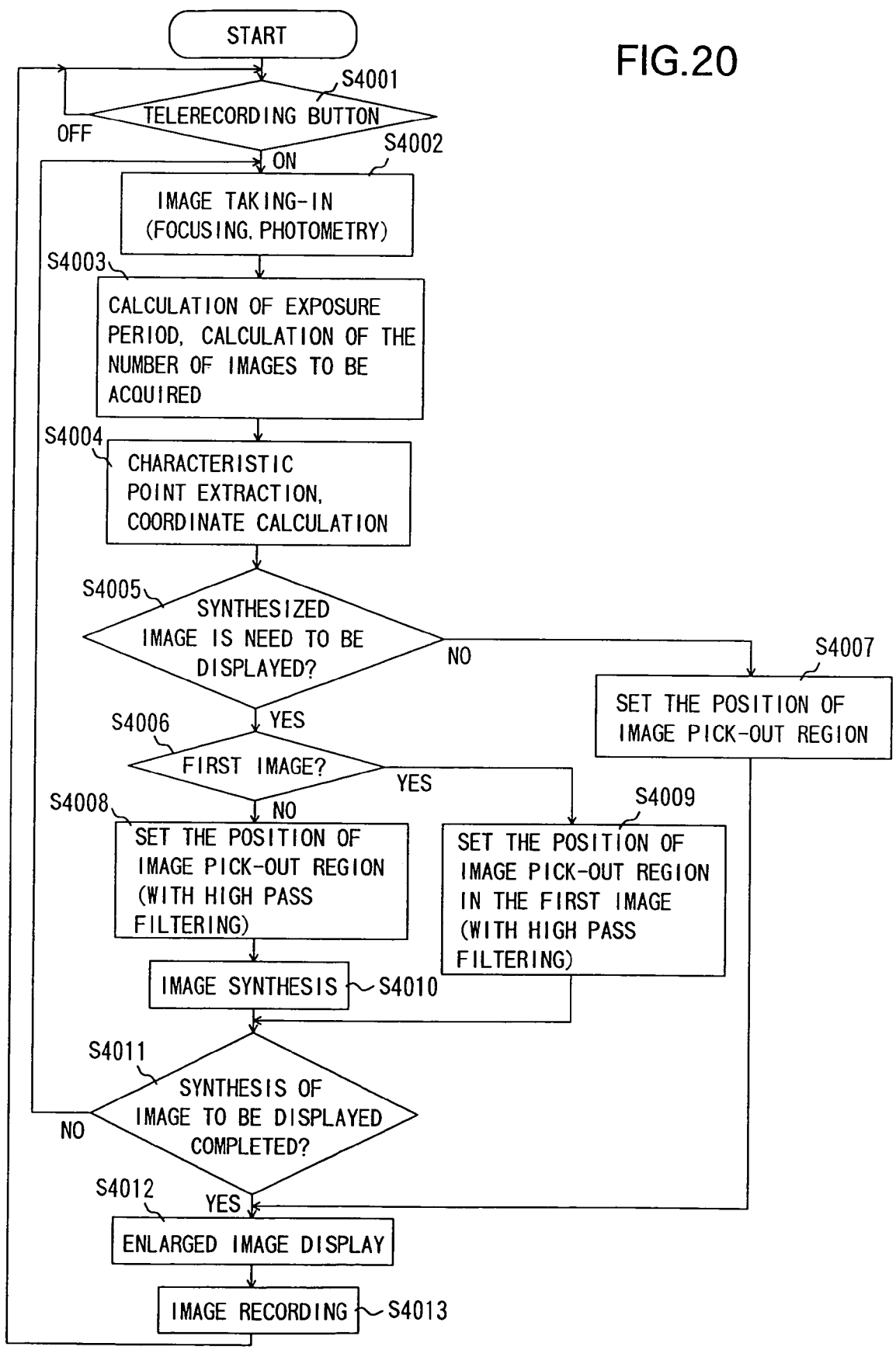
FIG. 20 is a flowchart showing image taking operation of a camera of Embodiment 5 of the present invention.

FIG. 20 is a flowchart summarizing the abovementioned operations, and this flow starts when the power source of the camera is turned on.

At Step S4001, the process waits until a photographer turns a record button on, provided on the camera and not shown, and when the record button is turned on, the process advances to Step S4002. In response to the operation of the record button, the process may advance not to the step S4002 of starting a recording operation but to the step S4002 of recording preparation operation.

At Step S4002, an image pickup operation is carried out by driving the image pickup device 19. The image taking control circuit 18 moves the image taking lens 11 in the optical axis direction by driving the AF drive motor 14a while detecting the contrast of an object image (image to be taken) based on an output of the signal processing circuit 111. When the contrast becomes highest, driving of the image taking lens 11 is stopped to turn the image taking optical system into a focused state (focusing by a so-called hill-climbing method). It is also possible that focusing operation is carried out by a phase different detection method.

Furthermore, the image taking control circuit 18 calculates the brightness (luminance) of the object based on the output of the image pickup device 19 (photometry).

At Step S4003, based on image taking conditions including the brightness of the object, etc., calculated at Step S4002, the number of images to be acquired and the exposure period when each image is acquired are determined.

At Step S4004, the displacement detection circuit 114 extracts a characteristic image (characteristic point) from the image and calculates the coordinates of this characteristic point. Herein, extraction of the characteristic point can be carried out by the same method as in the abovementioned Embodiment 1.

At Step S4005, based on the image taking conditions obtained at Step S4002, it is judged that a synthesized image needs to be displayed. Herein, a synthesized image is displayed in a case of, for example, telescopic image taking. In this case, in order to repress image blur, the exposure period is shortened (set to, for example, 1/300 seconds) and an image pickup operation is carried out a plurality of times to acquire images, and these images are synthesized to complement exposure.

On the other hand, in a case other than telescopic image taking, etc., it is judged that the synthesized image does not need to be displayed. In this case, images acquired by image pickup operations are displayed every image pickup operation.

When it is judged that the synthesized image needs to be displayed at Step S4005, the process advances to Step S4006, and otherwise the process advances to Step S4007.

At Step S4007, based on the coordinates of the characteristic point calculated at Step S4004, the position of the image pick-out region (region to be displayed) is determined. The position of the image pick-out region is determined based on the motion vector determined at Step S4004, and at this point, in consideration of framing operation of the camera, the position of the image pick-out region is determined based on a motion vector signal from which low frequency components have been eliminated (filtered by a high pass filter). Thereafter, the process advances to Step S4012.

At Step S4006, the coordinate conversion circuit 115 judges whether or not the acquired image is an image obtained by the first time of image pickup operation among images to be synthesized for display. Herein, when the acquired image is the image obtained by the first time of image pickup operation, the process advances to Step S4009, and otherwise the process advances to Step S4008.

At Step S4009, the coordinate conversion circuit 115 determines the position of an image pick-out region (region to be displayed) in the first acquired image based on a motion vector with respect to a synthesized image displayed immediately prior to the first acquired image.

The position of the image pick-out region in this case is determined based on the motion vector, however, for response to framing operation of the camera, the motion vector signal is subjected to high pass filtering, and the position of the image pick-out region is determined based on the motion vector signal that has been subjected to high pass filtering. In this high pass filtering, frequency components lower than the frequency f2 as shown by the solid line 135$b$ of FIG. 10 are eliminated to make respondent to framing operation of the camera. After the position of the image pick-out region is set, the process advances to Step S4011.

At Step S4008, the coordinate conversion circuit 115 determines the positions of image pick-out regions in images (other images) obtained by the second and subsequent times of image pickup operations, respectively. In detail, based on the position of the image pick-out region in the first acquired image determined at Step S4009 and motion vector obtained through calculation of correlations between the first acquired image and other image, the position of the image pick-out region in other image is determined.

At the stage of image synthesis, the purpose is to obtain a synthesized image without image blur, and in addition, high pass filtering is applied to motion vector signals between images to be synthesized so that continuous viewing of the synthesized images to be renewed in predetermined periods becomes natural. Then, based on motion vector signals subjected to high pass filtering, the positions of the image pick-out regions (regions to be synthesized) in the respective images to be synthesized are determined.

In this high pass filtering, as shown by the dashed line 135$a$ of FIG. 10, frequency components lower than the frequency f1 are eliminated so that the display can respond to slow motion (framing operation) of the camera.

At Step S4010, images obtained by the second and subsequent times of image pickup operations are synthesized with the image obtained by the first time of image pickup operation.

At Step S4011, it is judged whether or not images as many as required for exposure complement have been acquired, and in the case where images as many as required have been acquired, the process advances to Step S4012, and otherwise the process returns to Step S4002 and carries out acquiring of the next image.

At Step S4012, the synthesized image that has been synthesized finally at Step S4010 is displayed on the display unit 118. The display method used herein is as in Embodiment 3, wherein the image in the image pick-out region is enlarged and displayed so that the image pick-out region is matched in size with the display screen of the display unit 118.

After image display at Step S4012, the process advances to Step S4013 and the synthesized image data is recorded. Then, when the synthesized image data is recorded, the process returns to Step S4001 and repeats the recording operation.

As described above, in this embodiment, the quality of the displayed image is improved in the case where telescopic image taking is carried out by using a video camera. Herein, the vibration isolation performance (characteristics of the high pass filtering for the motion vectors) is changed between the interval for obtaining a synthesized image to be displayed and the interval for renewing the synthesized image. Thereby, synthesized images without image blur can be displayed, and the displayed images can be made respondent to framing operation of the camera. In addition, by applying high pass filtering at the stage of generation of synthesized images, switching between the synthesized images can be made natural as mentioned above.

In this embodiment, the image acquired by the first time of image pickup operation is used as a reference for image synthesis, however, it is also possible that an image acquired by the second or third time of image pickup operation can be used as a reference as long as it is included in the number of images to be acquired.

The present invention applies to a camera system which has a camera and a lens apparatus attached to the camera, and a camera integrated with a lens.

While preferred embodiments have been described, it is to be understood that modification and variation of the present invention may be made without departing from scope of the following claims.

What is claimed is:

1. An image taking apparatus which takes a first and a second images by using an image pickup device, comprising:
   a controller which detects a displacement amount of the second image with respect to the first image which is a reference image and performs predetermined processing at stages of pre-exposure for object observation and exposure for image taking; and
   a display unit which displays the first and the second images,
   wherein, at the stage of pre-exposure for object observation, the controller determines regions to be displayed on the display unit in the first and the second images based on the displacement amount, and makes the display unit to display the images in the regions sequentially in predetermined periods, and
   wherein, at the stage of exposure for image taking, the controller synthesizes the first and the second images so that the second image conforms to the first image based on the displacement amount to generate a synthesized image whose exposure is corrected; and
   wherein the controller comprises:
   a detection section which detects the displacement amount;
   a coordinate conversion section which performs coordinate conversion to the second image so as to conform to the first image based on the detection result of the detection section; and a synthesis section which synthesizes the second image having been converted by the coordinate conversion section and the first image.

2. The image taking apparatus according to claim 1, further comprising,
a recording section which records the first image and the synthesized image.

3. The image taking apparatus according to claim 2, further comprising;
a selection switch which selects one of the first image and the synthesized image recorded in the recording section.

4. The image taking apparatus according to claim 1, wherein
the detection section generates a displacement signal corresponding to the displacement amount, and
the coordinate conversion section performs the coordinate conversion to the second image based on a first calculated signal to which the displacement signal is converted based on a first frequency characteristic at the stage of pre-exposure for object observation, and based on a second calculated signal to which the displacement signal is converted based on a second frequency characteristic at the stage of exposure for image taking.

5. The image taking apparatus according to claim 4, wherein
the first frequency characteristic is a frequency characteristic in which a low-frequency side region of the displacement signal is excluded, and the second frequency characteristic is a frequency characteristic in which the low-frequency side region is not excluded.

6. The image taking apparatus according to claim 4, wherein
the coordinate conversion section changes one of the first and the second frequency characteristic according to the displacement amount.

7. The image taking apparatus according to claim 6, wherein
the coordinate conversion section changes one of the first and the second frequency characteristic with respect to a predetermined displacement direction.

8. The image taking apparatus according to claim 1, wherein
the display unit displays the synthesized image at the stage of exposure for image taking, and
areas of image regions to be displayed at the stages of exposure for image taking and pre-exposure for object observation are different from each other.

9. The image taking apparatus according to claim 8, wherein
the image region at the stage of exposure for image taking is larger than the image region at the stage of pre-exposure for object observation.

10. The image taking apparatus according to claim 1, wherein
the display unit displays the synthesized image at the stage of exposure for image taking, and
an area of an image region to be displayed at the stage of exposure for image taking is determined based on the displacement amount after the first and the second images are taken.

* * * * *

UNITED STATES PATENT AND TRADEMARK OFFICE
CERTIFICATE OF CORRECTION

PATENT NO. : 7,180,043 B2 Page 1 of 1
APPLICATION NO. : 10/852503
DATED : February 20, 2007
INVENTOR(S) : Koichi Washisu It is certified that error appears in the above-identified patent and that said Letters Patent is hereby corrected as shown below:

Column 1, line 58, delete " is build-in " and insert -- is built-in --

Signed and Sealed this

Fourth Day of September, 2007

JON W. DUDAS
*Director of the United States Patent and Trademark Office*